United States Patent
Lau et al.

(10) Patent No.: US 7,321,774 B1
(45) Date of Patent: Jan. 22, 2008

(54) INEXPENSIVE POSITION SENSING DEVICE

(75) Inventors: Chung Lau, Sunnyvale, CA (US); Peter P. Tong, Mountain View, CA (US); C. Douglass Thomas, Campbell, CA (US)

(73) Assignee: IpVenture, Inc., Los Altos, CA (US)

( * ) Notice: Subject to any disclaimer, the term of this patent is extended or adjusted under 35 U.S.C. 154(b) by 838 days.

(21) Appl. No.: 10/397,640

(22) Filed: Mar. 26, 2003

Related U.S. Application Data

(60) Provisional application No. 60/444,198, filed on Jan. 30, 2003, provisional application No. 60/418,491, filed on Oct. 15, 2002, provisional application No. 60/404,645, filed on Aug. 19, 2002, provisional application No. 60/375,998, filed on Apr. 24, 2002.

(51) Int. Cl.
*H04Q 7/20* (2006.01)

(52) U.S. Cl. ............... 455/456.1; 455/456.2; 455/456.3; 455/404.2; 455/414.2; 455/440; 340/539.13; 340/825.49; 340/988; 342/357.01; 342/357.06; 342/357.07; 342/357.13; 342/457; 701/213; 701/214; 701/215

(58) Field of Classification Search ............ 455/456.1, 455/456.2, 456.3, 404.2, 414.2, 440; 340/539.13, 340/825.49, 988; 342/357.01, 357.06, 357.07, 342/357.13, 457; 701/213, 214, 215
See application file for complete search history.

(56) References Cited

U.S. PATENT DOCUMENTS

| | | |
|---|---|---|
| 5,389,934 A | 2/1995 | Kass |
| 5,400,020 A | 3/1995 | Jones et al. |
| 5,461,365 A | 10/1995 | Schlager et al. |
| 5,491,486 A | 2/1996 | Welles, II et al. |
| 5,512,902 A | 4/1996 | Guthrie et al. |
| 5,515,858 A | 5/1996 | Myllymaki |
| 5,528,247 A | 6/1996 | Nonami |
| 5,528,518 A | 6/1996 | Bradshaw et al. |
| 5,539,748 A | 7/1996 | Raith |

(Continued)

FOREIGN PATENT DOCUMENTS

EP    0 874 529 A2    10/1998

(Continued)

OTHER PUBLICATIONS

"Audiovox Intros GPS, Bluetooth Phone;" INT Media Group, Inc. (allNetDevices), Apr. 5, 2002. (downloaded: www.allnetdevices.com/wireless/news.2001/1/15/audiovox_intros.html).

(Continued)

*Primary Examiner*—Quynh H. Nguyen

(57) ABSTRACT

Inexpensive position sensing devices that allow widespread use and availability of position information are disclosed. One embodiment of the position-sensing device acquires, down converts and extracts raw position data from position signals. Then, the position-sensing device wirelessly transmits the raw position data to a position-computing device, which converts the raw position data into the position of the device. The position-computing device can also receive auxiliary information from auxiliary sensors, and perform analyses based on the position and the auxiliary information. The position-computing device can re-transmit the position and auxiliary information to a remote site for further analysis and/or central storage. The remote site can also download information to the position-computing device. The position-computing device can also control an actuator to perform an operation.

34 Claims, 20 Drawing Sheets

U.S. PATENT DOCUMENTS

| | | |
|---|---|---|
| 5,541,845 A | 7/1996 | Klein |
| 5,550,551 A | 8/1996 | Alesio |
| 5,568,119 A | 10/1996 | Schipper et al. |
| 5,570,412 A | 10/1996 | LeBlanc |
| 5,576,716 A | 11/1996 | Sadler |
| 5,592,173 A | 1/1997 | Lau et al. |
| 5,623,260 A | 4/1997 | Jones |
| 5,629,678 A | 5/1997 | Gargano et al. |
| 5,652,570 A | 7/1997 | Lepkofker |
| 5,673,692 A | 10/1997 | Schulze et al. |
| 5,710,551 A | 1/1998 | Ridgeway |
| 5,712,619 A | 1/1998 | Simkin |
| 5,731,757 A | 3/1998 | Layson et al. |
| 5,731,788 A | 3/1998 | Reeds |
| 5,742,233 A | 4/1998 | Hoffman et al. |
| 5,751,245 A | 5/1998 | Janky et al. |
| 5,771,001 A | 6/1998 | Cobb |
| 5,774,876 A | 6/1998 | Woolley et al. |
| 5,797,091 A | 8/1998 | Clise et al. |
| RE35,920 E | 10/1998 | Sorden et al. |
| 5,826,195 A | 10/1998 | Westerlage et al. |
| 5,835,907 A | 11/1998 | Newman |
| 5,841,352 A | 11/1998 | Prakash |
| 5,844,862 A | 12/1998 | Cocatre-Zilgien |
| 5,850,196 A | 12/1998 | Mowers |
| 5,889,770 A | 3/1999 | Jokiaho et al. |
| 5,948,043 A | 9/1999 | Mathis |
| 5,959,575 A | 9/1999 | Abbott |
| 5,959,577 A | 9/1999 | Fan et al. |
| 5,963,130 A | 10/1999 | Schlager et al. |
| 5,995,849 A | 11/1999 | Williams et al. |
| 6,002,363 A | 12/1999 | Krasner |
| 6,002,982 A | 12/1999 | Fry |
| 6,009,319 A | 12/1999 | Khullar et al. |
| 6,013,007 A | 1/2000 | Root et al. |
| 6,014,080 A | 1/2000 | Layson, Jr. |
| 6,014,090 A | 1/2000 | Rosen et al. |
| 6,023,241 A | 2/2000 | Clapper |
| 6,032,051 A | 2/2000 | Hall et al. |
| 6,034,622 A | 3/2000 | Levine |
| 6,054,928 A | 4/2000 | Lemelson |
| 6,064,336 A | 5/2000 | Krasner |
| 6,067,018 A | 5/2000 | Skelton et al. |
| 6,067,044 A | 5/2000 | Whelan et al. |
| 6,072,396 A | 6/2000 | Gaukel |
| 6,078,290 A | 6/2000 | McBurney et al. |
| 6,083,248 A | 7/2000 | Thompson |
| 6,083,353 A | 7/2000 | Alexander |
| 6,094,168 A | 7/2000 | Duffett-Smith et al. |
| 6,100,806 A | 8/2000 | Gaukel |
| 6,131,067 A | 10/2000 | Girerd et al. |
| 6,141,570 A | 10/2000 | O'Neill, Jr. et al. |
| 6,144,303 A | 11/2000 | Federman |
| 6,148,280 A | 11/2000 | Kramer |
| 6,163,696 A | 12/2000 | Bi et al. |
| 6,171,264 B1 | 1/2001 | Bader |
| 6,172,640 B1 | 1/2001 | Durst et al. |
| 6,175,616 B1 | 1/2001 | Light et al. |
| 6,198,390 B1 | 3/2001 | Schlager et al. |
| 6,198,431 B1 | 3/2001 | Gibson |
| 6,198,930 B1 | 3/2001 | Schipper |
| 6,199,045 B1 | 3/2001 | Giniger et al. |
| 6,226,622 B1 | 5/2001 | Dabbiere |
| 6,231,519 B1 | 5/2001 | Blants et al. |
| 6,232,916 B1 | 5/2001 | Grillo et al. |
| 6,236,358 B1 | 5/2001 | Durst et al. |
| 6,238,337 B1 | 5/2001 | Kambhatla et al. |
| 6,243,039 B1 | 6/2001 | Elliot |
| 6,243,660 B1 * | 6/2001 | Hsu et al. ................. 702/160 |
| 6,246,376 B1 | 6/2001 | Bork et al. |
| 6,263,280 B1 | 7/2001 | Stingone, Jr. |
| 6,278,936 B1 | 8/2001 | Jones |
| 6,282,362 B1 | 8/2001 | Murphy et al. |
| 6,292,687 B1 | 9/2001 | Lowell et al. |
| 6,298,306 B1 | 10/2001 | Suarez et al. |
| 6,300,875 B1 | 10/2001 | Schafer |
| 6,314,308 B1 | 11/2001 | Sheynblat et al. |
| 6,317,049 B1 | 11/2001 | Toubia et al. |
| 6,323,807 B1 | 11/2001 | Golding et al. |
| 6,324,213 B1 | 11/2001 | Harrison |
| 6,327,533 B1 | 12/2001 | Chou |
| 6,331,817 B1 | 12/2001 | Goldberg |
| 6,339,397 B1 | 1/2002 | Baker |
| 6,340,928 B1 | 1/2002 | McCurdy |
| 6,349,257 B1 | 2/2002 | Liu et al. |
| 6,353,390 B1 | 3/2002 | Beri et al. |
| 6,353,798 B1 | 3/2002 | Green et al. |
| 6,356,841 B1 | 3/2002 | Hamrick et al. |
| 6,362,778 B2 | 3/2002 | Neher |
| 6,363,254 B1 | 3/2002 | Jones et al. |
| 6,363,323 B1 | 3/2002 | Jones |
| 6,377,810 B1 | 4/2002 | Geiger |
| 6,388,612 B1 | 5/2002 | Neher |
| 6,404,352 B1 | 6/2002 | Ichikawa et al. |
| 6,407,698 B1 | 6/2002 | Ayed |
| 6,411,892 B1 | 6/2002 | Van Diggelen |
| 6,411,899 B2 | 6/2002 | Dussell et al. |
| 6,421,538 B1 | 7/2002 | Byrne |
| 6,426,719 B1 | 7/2002 | Nagareda et al. |
| 6,427,120 B1 | 7/2002 | Garin et al. |
| 6,430,602 B1 | 8/2002 | Kay et al. |
| 6,433,732 B1 | 8/2002 | Dutta et al. |
| 6,441,778 B1 | 8/2002 | Durst et al. |
| 6,442,380 B1 * | 8/2002 | Mohindra ................. 455/234.1 |
| 6,443,890 B1 | 9/2002 | Schulze et al. |
| 6,445,937 B1 | 9/2002 | daSilva |
| 6,453,237 B1 | 9/2002 | Fuchs et al. |
| 6,469,639 B2 | 10/2002 | Tanenhaus et al. |
| 6,471,087 B1 | 10/2002 | Shusterman |
| 6,478,736 B1 | 11/2002 | Mault |
| 6,513,532 B2 | 2/2003 | Mault et al. |
| 6,522,871 B1 | 2/2003 | Patrick et al. |
| 6,522,889 B1 | 2/2003 | Aarnio |
| 6,529,164 B1 | 3/2003 | Carter |
| 6,544,193 B2 | 4/2003 | Abreu |
| 6,552,652 B2 | 4/2003 | Beken |
| 6,559,620 B2 | 5/2003 | Zhou et al. |
| 6,569,094 B2 | 5/2003 | Suzuki et al. |
| 6,579,231 B1 | 6/2003 | Phipps |
| 6,625,437 B1 | 9/2003 | Jampolsky et al. |
| 6,640,085 B1 | 10/2003 | Chatzipetros et al. |
| 6,650,907 B1 | 11/2003 | Kamperschroer et al. |
| 6,721,542 B1 | 4/2004 | Anttila et al. |
| 6,747,675 B1 | 6/2004 | Abbott et al. |
| 6,804,606 B2 | 10/2004 | Jones |
| 6,847,892 B2 | 1/2005 | Zhou et al. |
| 6,856,804 B1 | 2/2005 | Clotta |
| 6,865,385 B1 | 3/2005 | Kohda et al. |
| 6,952,645 B1 | 10/2005 | Jones |
| 6,975,941 B1 | 12/2005 | Lau et al. |
| 7,085,253 B2 | 8/2006 | Yang |
| 7,136,832 B2 | 11/2006 | Li et al. |
| 7,212,829 B1 | 5/2007 | Lau et al. |
| 7,218,938 B1 | 5/2007 | Lau et al. |
| 7,253,731 B2 | 8/2007 | Joao |
| 2001/0006891 A1 | 7/2001 | Cho |
| 2001/0020204 A1 | 9/2001 | Runyon et al. |
| 2001/0028304 A1 | 10/2001 | J'Anson et al. |
| 2001/0044299 A1 | 11/2001 | Sandegren |
| 2001/0052849 A1 | 12/2001 | Jones, Jr. |
| 2002/0000930 A1 | 1/2002 | Crowson et al. |
| 2002/0027507 A1 | 3/2002 | Yarin et al. |
| 2002/0038182 A1 | 3/2002 | Wong et al. |
| 2002/0050945 A1 | 5/2002 | Tsukishima et al. |

| | | | |
|---|---|---|---|
| 2002/0057192 | A1 | 5/2002 | Eagleson et al. |
| 2002/0063622 | A1 | 5/2002 | Armstrong et al. |
| 2002/0077080 | A1 | 6/2002 | Greene |
| 2002/0087260 | A1 | 7/2002 | Hancock et al. |
| 2002/0087619 | A1 | 7/2002 | Tripathl |
| 2002/0111171 | A1 | 8/2002 | Boesch et al. |
| 2002/0111819 | A1 | 8/2002 | Li et al. |
| 2002/0115453 | A1 | 8/2002 | Poulin et al. |
| 2002/0119789 | A1 | 8/2002 | Friedman |
| 2002/0193121 | A1* | 12/2002 | Nowak et al. ............. 455/456 |
| 2003/0003943 | A1 | 1/2003 | Bajikar |
| 2003/0009410 | A1 | 1/2003 | Ramankutty et al. |
| 2003/0013445 | A1 | 1/2003 | Fujiwara et al. |
| 2003/0069759 | A1 | 4/2003 | Smith |
| 2003/0151507 | A1 | 8/2003 | Andre et al. |
| 2004/0034470 | A1 | 2/2004 | Workman |
| 2004/0046637 | A1 | 3/2004 | Van Swaay |
| 2004/0114731 | A1 | 6/2004 | Gillett et al. |
| 2004/0117108 | A1 | 6/2004 | Nemeth |
| 2006/0173444 | A1 | 8/2006 | Choy et al. |

FOREIGN PATENT DOCUMENTS

| | | |
|---|---|---|
| EP | 1 037 447 A2 | 9/2000 |
| WO | WO 97/41654 | 11/1997 |
| WO | WO 98/01769 A1 | 1/1998 |
| WO | WO 98/16045 | 4/1998 |
| WO | WO 00/51391 | 8/2000 |
| WO | WO 01/50151 A1 | 7/2001 |
| WO | WO 02/42979 A1 | 5/2002 |
| WO | WO 02/084618 A1 | 10/2002 |
| WO | WO 03/012720 A1 | 2/2003 |

OTHER PUBLICATIONS

"Start-up crams single chip with phone, GPS and Bluetooth," CNET Network, Inc. (ZDNET), Mar. 22, 2002 (downloaded: http://news.zdnet.co.uk/story/0.128-x2107J63.00.html).
Smart Antenna, Specification sheet by Axiom Navigation Inc. (www.axiomnav.com).
Swift B2 GPS Reciever, Specification sheet by Axiom Navigation Inc. (www.axiomnav.com).
Swift A2 GPS Reciever, Specification sheet by Axiom Navigation Inc. (www.axiomnav.com).
SandPiper GPS Reciever, Specification sheet by Axiom Navigation Inc. (www.axiomnav.com).
"Fleet Management Systems-Asset Tracking Devices," Axiom Navigation, Inc., 2000-2001 (downloaded Oct. 19, 2002: www.axiomnav.com/Prod_Systems/prod_system.asp).
"Global Cell Phone Location," Axiom Navigation, Inc., 2000-2001 (downloaded Oct. 19, 2002: www.axiomnav.com/Prod_Global/prod_global.asp).
"X-GPS™ - Hybrid GPS Location Server Solution," Axiom Navigation, Inc., 2000-2001 (downloaded Oct. 19, 2002: www.axiomnav.com/Prod_Global/x-gps.asp).
"Digital/Analog Compass Sensors" and "1655 Digital Compass Sensor," webpages, The Robson Company, Inc., pp. 1-2 (downloaded Apr. 11, 2002: www.dinsmoresensors.com/index.html).
Delphi and MobileAria Demonstrate True Hands Free In-Vehicle Mobile Productivity Services At CES, Press Release, Delphi Automotive Systems, Jan. 8, 2002 (downloaded Apr. 5, 2002: www.delphiauto.com/pressRelease/pr6828-01082002).
"NavMate® Navigation System," Visteon Corporation, webpage, pp. 1-2 (downloaded Jun. 21, 2002: www.visteon.com/technology/automotive/navmate.html).
"Danger -Products" and "Hiphop Communicator Brochure," Danger, Inc., downloaded Oct. 26, 2003: www.danger.com/products.php).
"MMS phones: Don't believe the hype," CNN.com/SCI-TECH, Aug. 8, 2002, pp. 1-3.
"What is "3G" technology?," CNN.com/SCI-TECH, Oct. 22, 2001, pp. 1-3.

"Devices for Text Messages in Deutsche Telekom's fixed network have already found their way into many households," Deutsche Telekom AG, Press Release, Mar. 13, 2002, pp. 1-2.
"FunMail Launches on the NTT DoCoMo i-mode network," FunMail, Press Release, May 1, 2001, pp. 1-2.
"Send images to i-mode phones," Mobile Media Japan, 2001, pp. 1-3.
"Introduction to SMS," by C. Tull of AnywhereYouGo.com, pp. 1-4 (downloaded: www.devx.com/wireless/articles/SMS/SMSintro-asp).
"The Always on Network," Position Paper, Nortel Networks, 2002.
"Mobile Location Based Services: Cell Tracking Devices of People & Thongs.....," pp. 1-2, (downloaded: Aug. 10, 2002: http://3glocate.com).
"3G Mobile Internet Revolution, ...only with Location Based Services!" p. 1, (downloaded Aug. 10, 2002: http://webhome.idirect.com/~dental/3glocator/home.htm).
"What are Instant Messages?" Yahoo! Messenger Help, Yahoo! Inc., 2002, p. 1.
"What is a Friend List?" Yahoo! Messenger Help, Yahoo! Inc., 2002, p. 1.
"Status Icons/Messages, " Yahoo! Messenger Help, Yahoo! Inc., 2002, pp. 1-2.
"Yahoo! Messenger for WAP," Yahoo Messenger, Yahoo! Inc., 2002 (tours 1-9), pp. 1-17 (downloaded Oct. 27, 2002: www.messenger.yahoo.com/messenger/wireless/wap/tour1.html (through /tour9.html)).
IMVironment, Yahoo! Messenger, Yahoo! Inc., 2002, pp. 1-12 (downloaded (including) Oct. 27, 2002: http://help.yahoo.com/help/us/mesg/inov/inov-01.html (through /index5.html).
"Yahoo! Messenger for Text Messaging," Yahoo! Messenger, Yahoo! Inc., 2002, pp. 1-10 (downloaded Oct. 27, 2002: http://messenger.yahoo.com/messenger/wireless/smsmsgr/tour1.html (through /tour7.html)).
"Yahoo! Messenger - Sending messages to a Mobile Phone," Yahoo! Messenger, Yahoo! Inc., 2002, pp. 1-7 (downloaded Oct. 27, 2002: http://messenger.yahoo.com/messenger/wireless/pc2sms/tour1.html (through /tour7.html)).
LoadTrak, pp. 1-12 (downloaded Jun. 4, 2002: www.load-trak.com).
"pulver.com's Location Based Services Report," pulver.com, Inc., Oct. 2001, pp. 1-17 (downloaded Jun. 4, 2002: www.pulver.com/lbsreport/lastbsreport.02/oct01.txt).
"Wherify Wireless GPS Locator for Kids User Guide," Wherify Wireless, Inc., 2003, pp. 1-106.
"Wherify Wireless and SiRF Team to Deliver Child Locator System," Wherify Wireless, Inc., Press Release, Mar. 19, 2001, pp. 1-2.
"Wherify Wireless Breakthrough in Location-Based Services," Mobilemag.com, Feb. 28, 2001, p. 1.
"Wherify Wireless Location Services," Wherify Wireless, Inc., webpages, pp. 1-5 (downloaded: Mar. 25, 2003: www.wherifywireless.com/prod_watches.htm).
Marek, "The Unstoppable SnapTrack," Wireless Week, Dec. 18, 2000.
Rabinowitz and Spilker, Jr., "Positioning Using the ATSC Digital Television Signal," Rosum Corporation Whitepaper, Rosum Corporation (downloaded May 21, 2003).
Rabinowitz and Spilker, Jr., "A New Positioning System Using Television Synchronization Signals," Rosum Corporation, pp. 1-11 (downloaded May 21, 2003).
"Trimble and Rosum Team to Develop Universal Positioning Technology," Trimble Navigation, Inc., News Release, Feb. 27, 2003.
Wong, "Fishers, golfers join the rush to GPS," San Jose Mercury News, news article, Mar. 25, 2002.
Ryan, "Catching up with Dick Tracy," San Francisco Chronicle, news article, Mar. 18, 2002.
"Theme Park Visitors & Cashless Puchasing," Case Study, RJI Incorporated, webpages, pp. 1-2 (downloaded Mar. 16, 2002: www.rji.cc/casestudies/themepark.html).
"Ski Rental with Auto ID and Tracking," Case Study, RJI Incorporated, webpages, pp. 1-2 (downloaded Mar. 16, 2002: www.rji.cc/casestudies/skirentalcompany.html).
"Real-Time Warehouse Tracking," Case Study, RJI Incorporated, webpages, pp. 1-2 (downloaded Mar. 16, 2002: www.rji.cc/casestudies/rtwarehousetracking.html).

"Frozen Food Warehouse," Case Study, RJI Incorporated, webpages, pp. 1-3 (downloaded Mar. 16, 2002: www.rji.cc/casestudies/frozenfoodwarehouse.html).

"Airline Cargo Containers," Case Study, RJI Incorporated, webpages, pp. 1-2 (downloaded Mar. 16, 2002: www.rji.cc/casestudies/airlinecargocontainers.html).

"Airline Food Carts," Case Study, RJI Incorporated, webpages, pp. 1-2 (downloaded Mar. 16, 2002: www.rji.cc/casestudies/airlinefoodcarts.html).

"Real Time Location System (RTLS)," Case Study, RJI Incorporated, webpage, p. 1 (downloaded Mar. 16, 2002: www.rji.cc/casestudies/rtls.html).

"Radio Frequency Identification (RFID)," Case Study, RJI Incorporated, webpage, p. 1 (downloaded Mar. 16, 2002: www.rji.cc/casestudies/rfid.html).

"MoniTrack," Case Study, RJI Incorporated, webpages, pp. 1-2 (downloaded Mar. 16, 2002: www.rji.cc/casestudies/telematic.html).

"Parkwatch And Wherenet Unveil The First Amusement Visitor Locating System," ParkWatch, Press Release, Jun. 27, 2000.

Real Time Locating System, Executive Summary, Technology Systems International, Inc.

"Locate Networks: Our Service," Locate Networks, webpages, pp. 1-7 (downloaded Sep. 26, 2002: www.locatenetworks.com/).

"Technical Applications Of Our Current Technology," Aetherwire, webpages, pp. 1-4 (downloaded Mar. 16, 2002: www.aetherwire.com/CDROM/General/appl1.html).

Bickers, "Eyes in the sky," SafeTzone Technology Corporation, webpages, 2001, pp. 1-3 (downloaded: www.safetzone.com/newsKiosk.asp).

"IO Data Develops GPS Adapter for I-Mode Mobile," AsiaBizTech, Sep. 17, 2002, pp. 1-2.

"Pakhound: Your Watchdog In The Shipping Industry," website pages, pp. 1-3 (downloaded Jun. 9, 2002: www.pakhound.com/fact.asp).

"Guide to Tracking Info.," Nippon Express, website page, p. 1 (downloaded Jun. 9, 2002: www.nittsu.co.jp/edoc/howtoe.htm).

My.Roadway!, Roadway Express, Inc., webpages, pp. 1-2 (downloaded Jun. 9, 2002: www.quiktrak.roadway.com/cgi-bin/quiktrak).

Packtrack™, PackTrack.com, webpages, pp. 1-2 (downloaded Jun. 9, 2002: www.packtrack.com).

"Welcome to Traker Systems," Tracker Systems, webpages, pp. 1-2 (downloaded Jun. 9, 2002: www.trakersystems.com).

"Welcome to Iship, Inc.," iShip, Inc., webpages, pp. 1-2 (downloaded Jun. 9, 2002: www.iship.com).

"Turning Position Into Knowledge,"SkyBitz, webpage, p. 1 (downloaded Nov. 15, 2002: www.skybitz.com).

"News,"SkyBitz, webpages, pp. 1-8 (downloaded Nov. 15, 2002: www.skybitz.com/about/news.html).

"GLS Communicator,"SkyBitz, webpages, pp. 1-2 (downloaded Nov. 15, 2002: www.skybitz.com/gls/communicator.html).

"Global Locating Services,"SkyBitz, webpage, p. 1 (downloaded Nov. 15, 2002: www.skybitz.com/services/gls.html).

F. Rivera, "Special Report: Keeping Tabs on Your Teen,", 7 News, Boston, Apr. 30, 2002, pp. 1-3.

GPS2000, Omega Research and Development, Inc., webpages, pp. 1-9 (pp. 7-9 pertain to an online tour) (downloaded Jul. 14, 2003: www.gps2000online.com/).

"Track Your FedEx Shipments via Email,"FedEx, webpages, pp. 1-2 (downloaded Oct. 29, 2002: www.fedex.com).

"Track Shipments — Detailed Results,"FedEx, webpages, pp. 1-2 (downloaded Oct. 29, 2002: www.fedex.com).

FedEx Insight, FedEx, webpages, pp. 1-11 (downloaded Oct. 29, 2002: www.fedex.com).

"Tracking Helpful Tips," United Parcel Service of America, Inc. (UPS), webpages, pp. 1-2 (downloaded Jun. 1, 2002: www.ups.com/tracking/um_help.html).

"My UPS.com Benefits," United Parcel Service of America, Inc. (UPS), webpages, pp. 1-2 (downloaded Apr. 13, 2002: www.ups.com/myupsinfo/info/benefits/pnav=stdsservice).

"Enhanced Tracking," United Parcel Service of America, Inc. (UPS), webpages, pp. 1-2 (downloaded Jun. 1, 2002: www.ups.com/myupsinfo/info/benefits/etrack?pnav=stdsservice).

"UPS Package Tracking," United Parcel Service of America, Inc. (UPS), webpages, pp. 1-2 (downloaded Apr. 13, 2002: www.ups.com/tracking/tracking.html).

"UPS Wireless Solutions," United Parcel Service of America, Inc. (UPS), webpage, p. 1 (downloaded Apr. 13, 2002: www.ups.com/myupsinfo/info/benefits/wireless?pnav=stdsservice).

Crossbow Product Guide - Accelerometers, Crossbow Technology, Inc., webpages, pp. 1-3 (downloaded Apr. 11, 2002: www.xbow.com/Products/Accelerometers.htm).

Accelerometers - General Purpose, LP Series, Crossbow Technology, Inc., data sheet, pp. 1-3 (downloaded Apr. 11, 2002: www.xbow.com/Products/Accelerometers.htm).

Precision Accelerometers, PCB Piezoelectronics Products - SVS Division, webpages, pp. 1-2 (downloaded Apr. 11, 2002: www.pcb.com/products/svs/index.html).

"352C22 Miniature Low Profile ICP Accelerometer," Precision Accelerometers, PCB Piezoelectronics Products - SVS Division, webpages, pp. 1-2 (downloaded Apr. 11, 2002: www.pcb.com/products/svs/svs352c22.html).

K. Hill, "Prada Uses Smart Tags To Personalize Shopping," CRMDaily.com, Apr. 24, 2002., pp. 1-4.

"Savi Reusable Transport Container," Savi Technology, Inc., Apr. 30, 2002, pp. 1-2.

"Developing a GPSs for the Global Supply Chain," Aberdeen Group, Inc., Executive White Paper, Jun. 2002.

Motorola Consumer Catalog: Pagers (webpage), Motorola, Inc., downloaded Jan. 19, 2000.

SnapTrack in Action (webpage), SnapTrack Inc., downloaded Jan. 19, 2000.

SnapTrack - Technology At Work (webpage), SnapTrack Inc., downloaded Jan. 19, 2000.

SnapTrack - Privacy Protection (webpage), SnapTrack Inc., downloaded Jan. 19, 2000.

"An Introduction to SnapTrack Server-Aided GPS Technolgy," SnapTrack Inc.

"SnapTrack and SignalSoft Corp. Team Up to Trial Location-based Information Service for GSM Test Group," Press Release, SnapTrack Inc., Dec. 6, 1999.

"SnapTrack Awarded Additional Key Patents for Enhanced GPS System," Press Release, SnapTrack Inc., Jan. 4, 2000.

TruePosition Virtual Brochure (webpage), TruePosition, Inc.

"Carrier and end-user applications for wireless location systems," TruePosition, Inc., pp. 1-7.

Stilp, Louis A., "Examining the Coming Revolution in Location Services," pp. 1-11.

Commercial Uses for LoJack (webpage), LoJack Corporation, downloaded Jan. 22, 2000.

Chertkoff, Rachel, "Vehicle Locator Systems," Pager Technology, pp. 1-2, 1998.

"EarthTrack™ Vehicle Tracking Systems," Outfitter Satellite, Inc., 1998 (downloaded Jan. 22, 2000).

Kleinknecht, William, "Juvenile authorities want satellite tracking for felons," The Star-Ledger of New Jersey, Nov. 18, 1997.

* cited by examiner

INEXPENSIVE POSITION SENSING DEVICE

CROSS REFERENCE TO RELATED APPLICATIONS

This application claims benefit of (i) U.S. Provisional Patent Application No. 60/444,198, filed Jan. 30, 2003, and entitled "SYSTEM, METHOD AND APPARATUS FOR ACQUIRING, PRESENTING, MONITORING, DELIVERING, MANAGING AND USING STATUS INFORMATION," which is hereby incorporated herein by reference; (ii) U.S. Provisional Patent Application No. 60/418,491, filed Oct. 15, 2002, and entitled "SYSTEM, METHOD AND APPARATUS FOR ACQUIRING, PRESENTING, MONITORING, DELIVERING, MANAGING AND USING STATUS INFORMATION," which is hereby incorporated herein by reference; (iii) U.S. Provisional Patent Application No. 60/404,645, filed Aug. 19, 2002, and entitled "SYSTEM, METHOD AND APPARATUS FOR ACQUIRING, PRESENTING, MONITORING, DELIVERING, MANAGING AND USING POSITION AND OTHER INFORMATION," which is hereby incorporated herein by reference; and (iv) U.S. Provisional Patent Application No. 60/375,998, filed Apr. 24, 2002, and entitled "SYSTEM, METHOD AND APPARATUS FOR ACQUIRING, PRESENTING, MANAGING AND USING POSITION INFORMATION," which is hereby incorporated herein by reference.

This application is also related to: (i) U.S. patent application Ser. No. 10/397,473, filed Mar. 26, 2003, and entitled "METHOD AND APPARATUS FOR INTELLIGENT ACQUISITION OF POSITION INFORMATION;" (ii) U.S. patent application Ser. No. 10/397,472, filed Mar. 26, 2003, and entitled "METHODS AND APPARATUS TO ANALYZE AND PRESENT LOCATION INFORMATION;" (iii) U.S. patent application Ser. No. 10/397,641, filed Mar. 26, 2003, and entitled "METHOD AND SYSTEM FOR PERSONALIZED MEDICAL MONITORING AND NOTIFICATIONS THEREFOR;" (iv) U.S. patent application Ser. No. 10/397,637, filed Mar. 26, 2003, and entitled "METHOD AND SYSTEM FOR PROVIDING SHIPMENT TRACKING AND NOTIFICATIONS;" (v) U.S. patent application Ser. No. 10/397,474, filed Mar. 26, 2003, and entitled "METHOD AND SYSTEM FOR ENHANCED MESSAGING;" (vi) U.S. patent application Ser. No. 10/397,512, filed Mar. 26, 2003, and entitled "APPLICATIONS OF STATUS INFORMATION FOR INVENTORY MANAGEMENT."

BACKGROUND OF THE INVENTION

The present invention relates generally to a position-sensing device and more particularly to an inexpensive position-sensing device that may include other types of sensors.

It is extremely useful to be able to automatically and continually identify the location of an object or a person, particularly if this can be done inexpensively. Imagine a week from now is your first wedding anniversary. Due to business reasons, you suddenly are called to travel to a remote site, thousands of miles away from your spouse. She is terribly annoyed by your absence. It is an important day. Fortunately, immediately after arrival at the site, you have succeeded in getting her some very nice gifts. An express service promises that she will get the gifts exactly on the anniversary day, which is four days from now. Wouldn't it give you the peace of mind if you could periodically track the location of the package during the next four days? Four days later, assuming that the gifts will be arriving at your home in the next twenty minutes, wouldn't she be thrilled if she gets an intimate call from you, and during the call, the gifts arrive right at her doorsteps? She probably will forgive you for not being with her during the first wedding anniversary. There may even be some pleasant surprises waiting for you when you get home!

Let's step back and assume that the gifts include a pair of exotic fruits from the Orient. You know your spouse has never tasted such fruits before and she would love to taste them. You also know it is going to take four days before the gifts reach your house. To keep their freshness, the fruits have to be refrigerated during the trip at a temperature below 50 degree Fahrenheit. The express service guarantees that your gifts will be kept at low temperature, not higher than 45 degrees. You constantly worry that the power to the refrigerator may be accidentally turned off, causing the temperature to gradually go up, and ruining the fruits. Wouldn't you be willing to pay a small price if the express service provides a feature where your pager would beep if the ambient temperature of your gifts goes above 45 degrees? This will then allow you to immediately call the express service and sound the alarm.

Even if what have been described is technologically feasible, it would probably be prohibitively expensive. One of the critical barriers is the position sensor indicating the location of the gifts. A typical global-positioning system (GPS) receiver, such as one in a car, costs about two thousand dollars (US$2000.00). A handheld GPS system for hiking costs more than two hundred and fifty dollars (US$250.00). The auto manufacturers may be able to afford to have such an expensive item for vehicle navigation of automobiles. It is inconceivable to expect common citizens to be able to afford such a device.

In addition, the sizes of the systems can be an annoying factor. You don't want the systems to be a few times larger in size or heavier in weight than your gifts. The cost of transport will then be predominately due to the systems. Imagine you are using Federal Express to send your company brochure—a few ounces—to a customer. It is unreasonable to attach a four-pound GPS system to the Federal Express package. One way to get around this hurdle is wait till there is a critical mass accumulated before shipping to a destination. But, customers go for an express service because they want speedy delivery, and thus are probably not willing to wait.

It should be apparent from the foregoing that there is a genuine need for an inexpensive position-sensing device. Such a device would probably be suitable for many more applications if it has a small form factor.

SUMMARY OF THE INVENTION

In general, the present invention relates to an inexpensive position-sensing device that allows widespread use and availability of position information. The availability of position information in an inexpensive manner is highly desirable. However, there are a number of factors preventing such availability, such as cost and, sometimes, the size of the sensors. In one approach, the present invention provides an inexpensive position-sensing device that can be attached to or located on an object. In another embodiment, the position-sensing device is in a convenient form factor applicable for transport. Based on a number of embodiments of the present invention, position information can become not only a sought-after feature, but also a common commodity.

One embodiment of the invention includes a position-sensing device, which can be based on GPS technology. After acquiring position signals, the device extracts raw position data from the signals. Then, the device wirelessly transmits the raw position data to a position-computing device. The position-computing device can be used to convert the raw position data received into the position of the position-sensing device. The position-computing device can also receive auxiliary information from auxiliary sensors. Further analysis can then be performed based on the position and the auxiliary information. Examples of auxiliary sensors are pressure sensor, smoke detectors and heat sensors. The auxiliary sensors can capture their corresponding auxiliary information and provide them to the position-computing device.

The position-computing device can re-transmit the position of the position-sensing device with the auxiliary information to a remote site for additional analysis. The remote site can include a website. The remote site can provide additional intelligence and send different types of information back to the position-computing device. For example, location, map or traffic information can be downloaded to the position-computing device.

The position-computing device can also control an actuator. Based on an analysis performed by the remote site, the position-computing device can send a signal to an actuator to perform an operation. The operation can simply be displaying a message, flashing a signal or turning on a heater.

In one embodiment, the position-sensing device does not include a keyboard or display. This facilitates the position-sensing device in being compact in size and inexpensive. In addition, in another embodiment, a number of components of the position-sensing device's circuitry can be integrated together. For example, the components can be incorporated on two semiconductor chips, one substantially for radio-frequency circuits and the other for low-frequency baseband processing circuits. With the advantageous size and cost benefits, the position-sensing devices can be conveniently included into packages for shipment to track the packages, or can be attached to a person for monitoring purposes.

In one approach, an auxiliary sensor can be integrated into the position-sensing device, and the fabrication process can include micromachining techniques.

Other aspects and advantages of the present invention will become apparent from the following detailed description, which, when taken in conjunction with the accompanying drawings, illustrates by way of example the principles of the invention.

Same numerals in FIGS. 1-19 are assigned to similar elements in all the figures. Embodiments of the invention are discussed below with reference to FIGS. 1-19. However, those skilled in the art will readily appreciate that the detailed description given herein with respect to these figures is for explanatory purposes as the invention extends beyond these limited embodiments.

DETAILED DESCRIPTION OF THE INVENTION

Figure 1:
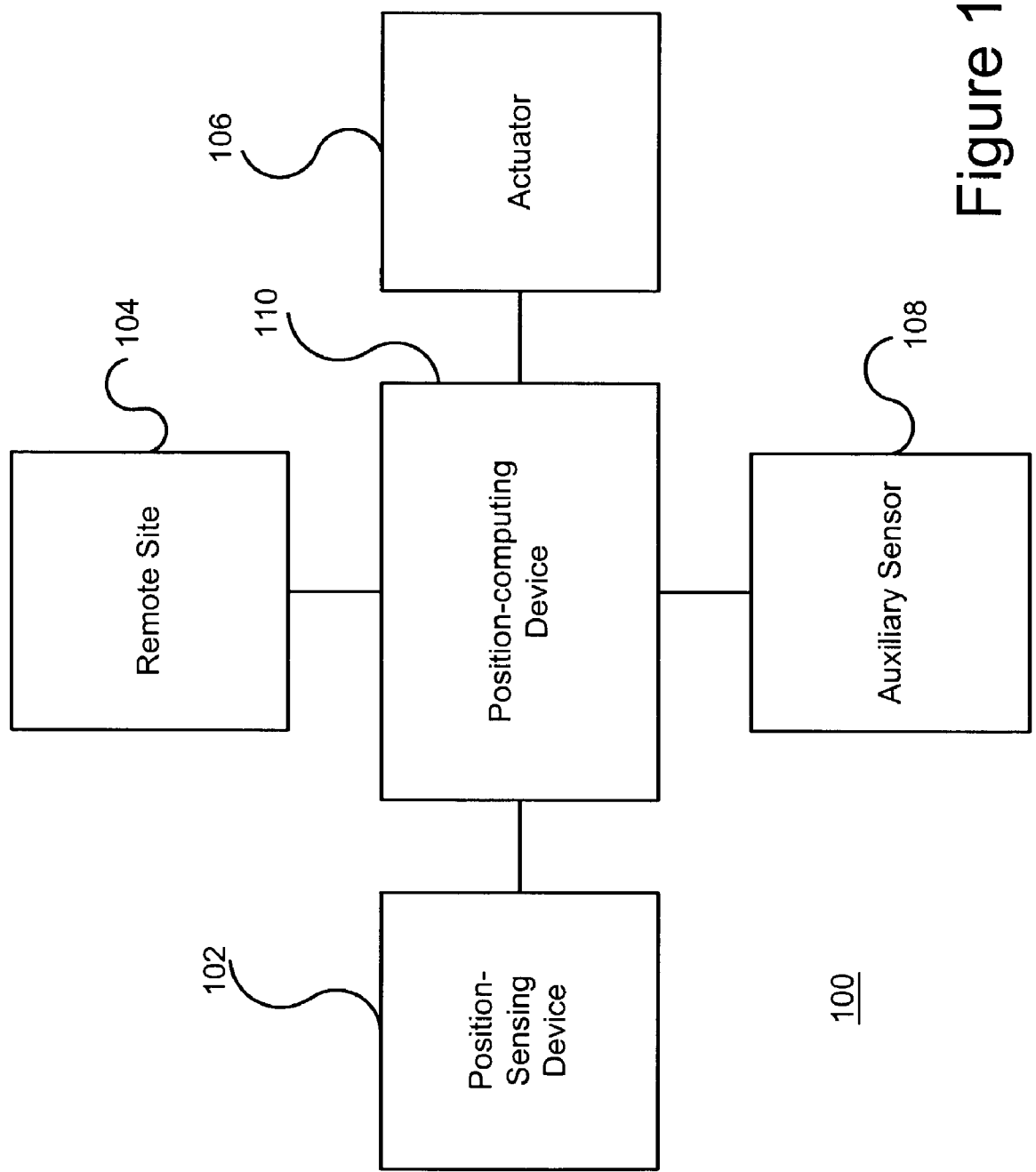
FIG. 1 shows one embodiment of the present invention.

FIG. 1 shows a position-sensing device 102 according to one embodiment of the invention. The position-sensing device 102 can be coupled to a position-computing device 110, which, in turn, can be coupled to an auxiliary sensor 108, a remote site 104, and an actuator 106. The position-sensing device 102 can be based on global positioning system (GPS) technology, and can be compact and inexpensive. In one implementation, in a general sense, the position-sensing device 102 only has to track the GPS satellites and send raw position data to the position-computing device 110 where position computation can be performed. The position-sensing device 102 can be very portable. For example, one can easily affix the position-sensing device 102 to a person, package or other object. As another example, the position-sensing device 102 can be temporarily placed within a vehicle and easily carried from one vehicle to another.

In one approach, the position-computing device 110 receives and converts the raw position data from the position-sensing device 102 into the position of the position-sensing device. In another approach, the position-computing device 110 can receive the raw position data from the position-sensing device 102 and then forward the raw position data (or a partially processed version thereof) to a remote computing device (e.g., remote server) for additional processing.

In one embodiment, a position sensor as used herein refers to a system, apparatus or device that includes not only a position-sensing device but also a position-computing device. For example, with respect to FIG. 1, the position-sensing device 102 and the position-computing device 110 can together be referred to as a position sensor.

Figure 2:
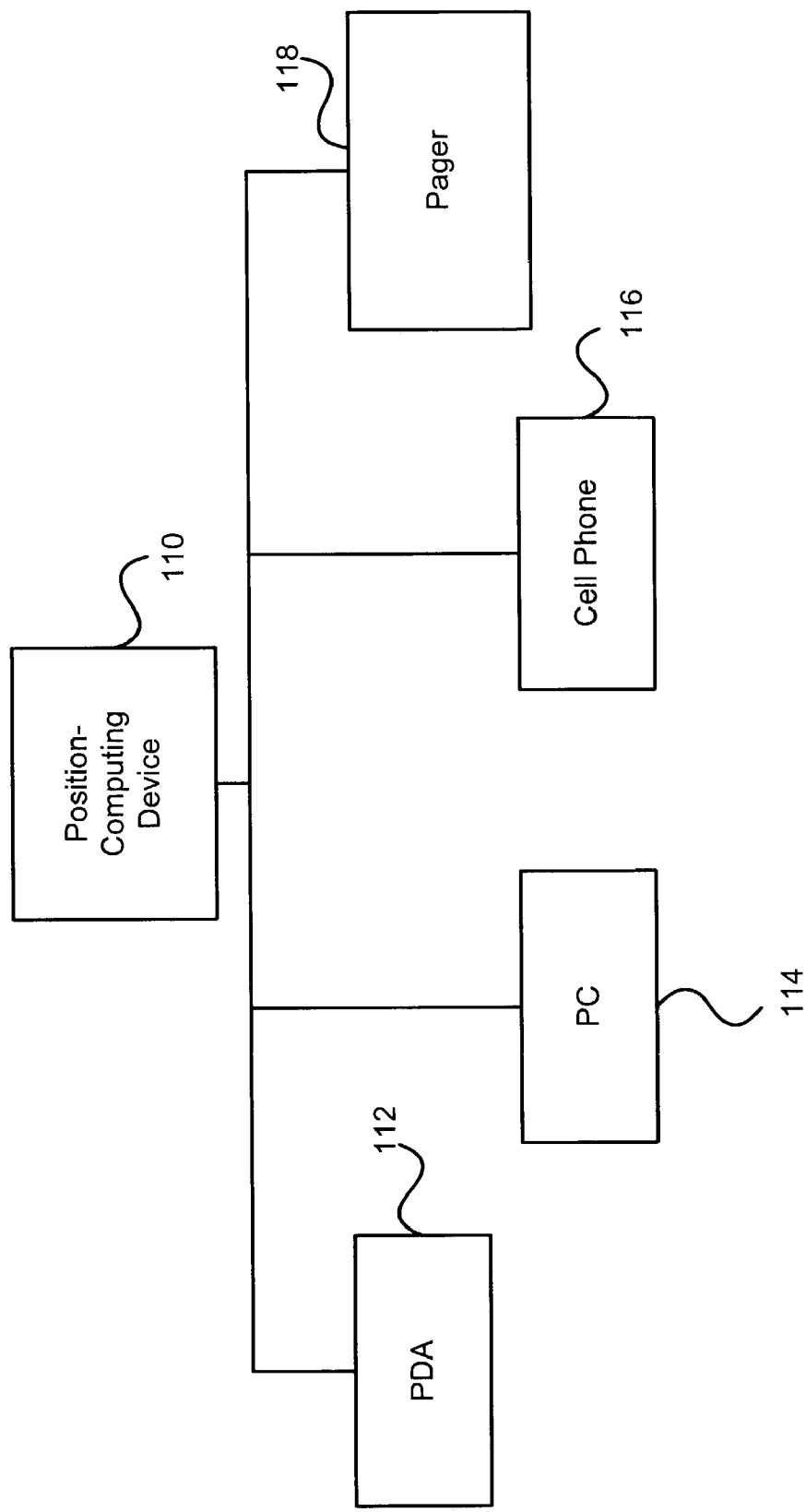
FIG. 2 shows a number of embodiments for the position-computing device of the present invention.

FIG. 2 shows a number of embodiments for the position-computing device 110. The position-computing device 110 can be a personal digital assistant (PDA) 112, a personal computer (PC) 114, a cell phone 116, a pager 118, or other types of electronic device typically with computation and signal transceiving capabilities.

In one embodiment, the position-sensing device 102 does not have any user input/output interface other than a link (e.g., wireless link) to the position-computing device 110. With such an embodiment, the position-sensing device 102 can be made particularly small and low cost. The position-computing device 110, which can be a portable device, can provide user-interface functionality. For example, the position-computing device 110 can include a keyboard, a touchpad or a stylus for information entry. The output of the position-computing device 110 can be text, audio or graphical. When the position-computing device 110 has a display screen, then text or graphics can be displayed on the display screen. As an example of a graphics output, the position-computing device 110 can display a moving map on the display screen. In the case of an audio output, the position-computing device 110 can, for example, output voice instructions pertaining to positions. In one embodiment, the computation capabilities of the position-computing device 110 are also applicable for other applications. For example, when the position-computing device 110 is implemented by a PDA 112, the PDA 112 can operate to perform processing for calendars, appointments, address books, phone books, or other application provided by the PDA 112.

Figure 3:
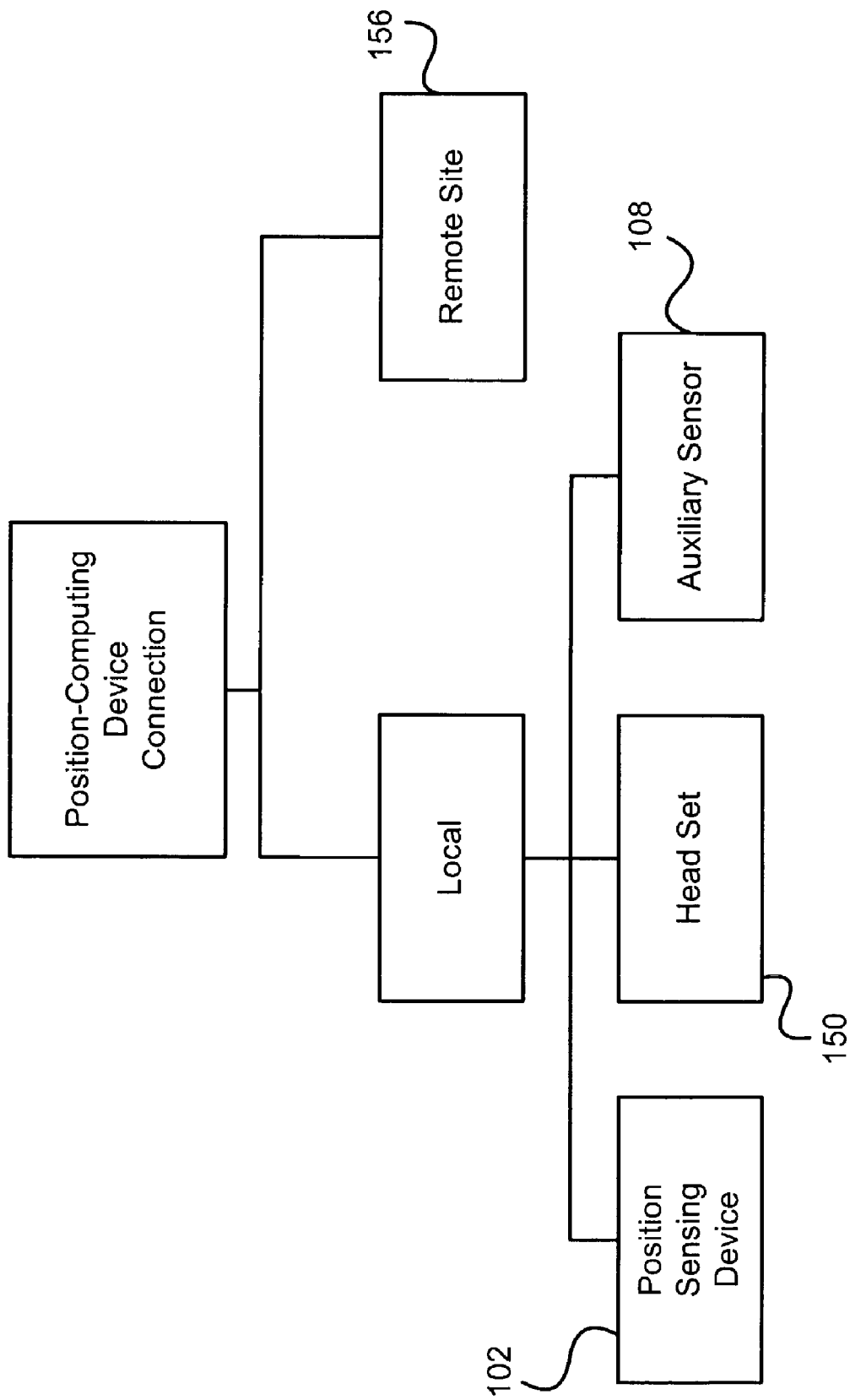
FIG. 3 shows examples of connections made by the position-computing device of the present invention.

FIG. 3 shows examples of connections that can be made by the position-computing device 110. Locally, the position-computing device 110 can be coupled to a position-sensing device 102. In one embodiment, the communication between the position-sensing device 102 and the position-computing device 110 can, for example, be via a Bluetooth network or a wireless LAN (e.g., Wi-Fi, 802.11a or 802.11b). In such an embodiment, the position-computing device 110 can be placed anywhere within the signal reception range of the wireless link from the position-sensing device 102. For instance, the position-computing device 110 can be placed in the shirt pocket of a driver, and the position-sensing device can be on the dashboard of the car. In any case, since the position-computing device 110 and the position-sensing device 102 do not have to be physically tied together via a cable, a user enjoys greater freedom in the placement of the position-sensing device 102 and the position-computing device 110. In yet another embodiment, the communication between the position-sensing device 102 and the position-computing device 110 can be through a serial connection (e.g., USB or FIREWIRE link).

The position-computing device 110 can also be wirelessly coupled to a head set 150 having a speaker and a microphone. Again, as an example, the wireless coupling between the position-computing device 110 and the heat set 150 can be via the Bluetooth or Wi-Fi protocols.

In one embodiment, a user wearing the headset 150 can receive voice instructions via the wireless link between the position-computing device 110 and the headset 150. In addition to receiving the voice instructions (e.g., voice directions), the user can also issue voice commands to the position-computing device 110 via the microphone of the head set 150. Alternatively, the headset 150 can couple to the position-computing device 110 via a wired link (e.g., cable).

Figure 4:
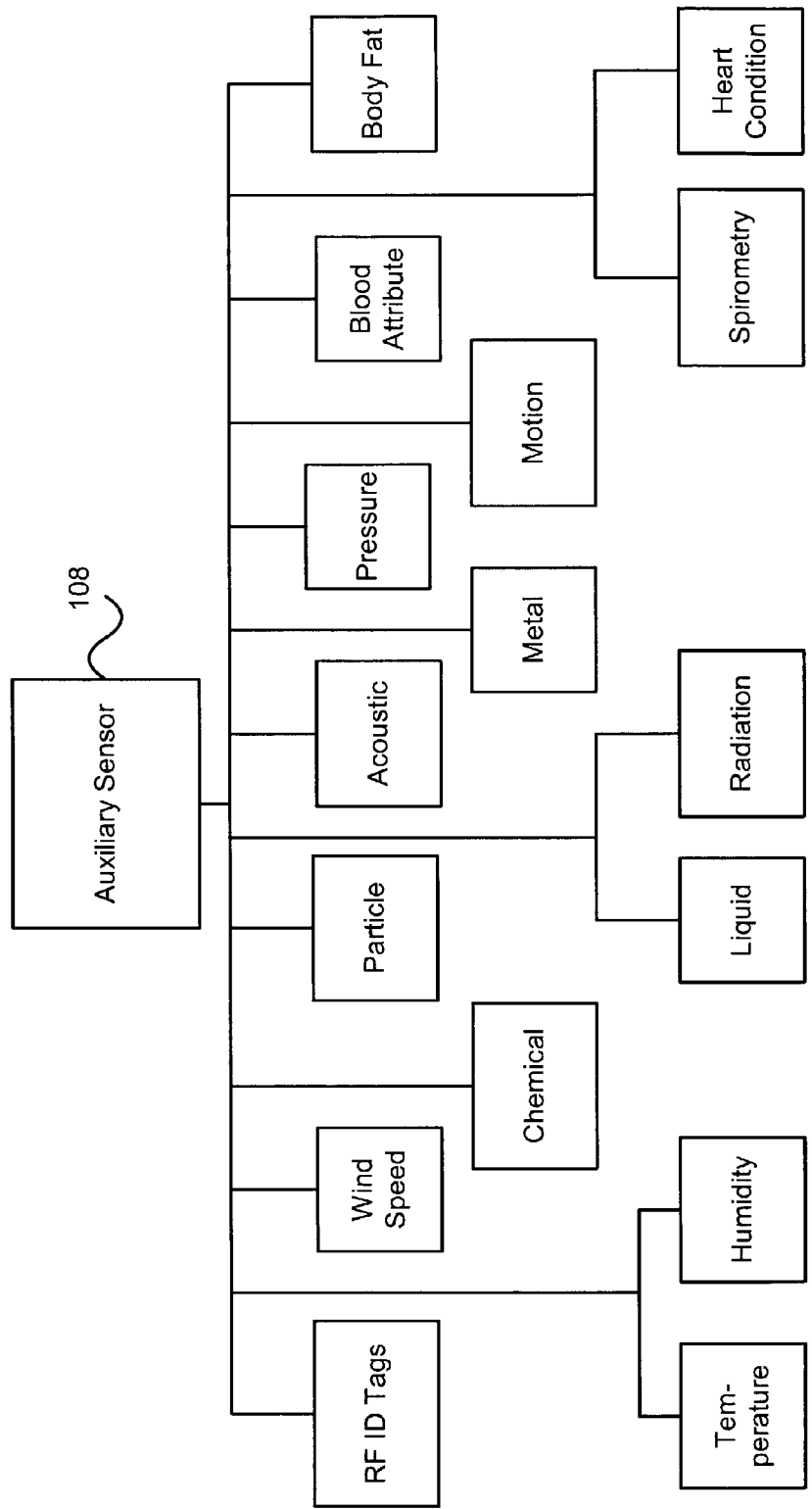
FIG. 4 shows examples of auxiliary sensors of the present invention.

The position-computing device 110 can be locally coupled to one or more of the auxiliary sensors 108. FIG. 4 shows examples of auxiliary sensors 108. The auxiliary sensors 108 capture or acquire auxiliary information, and then can wirelessly transmit such information to the position-computing device 110. In one embodiment, an auxiliary sensor is not a position-sensing device.

The auxiliary sensor 108 can be an environment sensor, capturing information regarding the environment where the position-sensing device 102 is located. For example, the auxiliary sensor 108 can be a sensor for temperature, humidity, wind speed, chemicals, particle, liquid, radiation, sound/acoustic, metal or pressure. When the auxiliary sensor 108 is a chemical sensor, the sensor can, for example, sense oxygen level or carbon monoxide level. Similar to a chemical sensor, the auxiliary sensor 108 can be an odor sensor. When the auxiliary sensor 108 is a particle sensor, the sensor can, for example, be a smoke detector. When the auxiliary sensor 108 is a radiation detector, the sensor can, for example, be a light sensor or an infrared detector. When the auxiliary sensor 108 is a pressure sensor, the sensor can, for example, sense atmospheric pressure or device (e.g., tire) pressure.

The auxiliary sensor 108 can also capture information pertaining to the position-sensing device 102. In other words, the auxiliary sensor 108 can sense information pertaining to the position-sensing device 102 itself, such as its motion or pressure asserted on it. The information related to the motion of the position-sensing device 102 can be its speed, direction of travel, acceleration, shock, or vibration. Regarding pressure, the auxiliary sensor 108 can sense the force or pressure asserted on the position-sensing device 102.

In one embodiment, the auxiliary sensor 108 can be part of the position-sensing device 102 and sense information regarding a living being (e.g., a person). The position-sensing device 102 may be attached to the being or be in close proximity to the being. The information sensed by the auxiliary sensor 108 can include the being's vital parameters. For example, the auxiliary sensor 108 can measure the being's body temperature, blood attributes, spirometry, heart conditions, brain wave, sound/acoustic waves, or body fat. The blood attributes can include blood pressure, blood sugar or glucose level, or blood oxygen. Heart conditions can include ECG, heart rate, or arrhythmias. Sound/acoustic waves can be those measurable by a stethoscope or an ultrasound scanner. The auxiliary sensors 108 can be non-invasive or invasive. The auxiliary sensors 108 can be in vitro or in vivo.

Still further, the auxiliary sensors 108 can also pertain to sensors for color, pattern, or touch (tactile).

In one embodiment, the position-computing device 110 can be coupled to a remote site 156, and can transmit the position-sensing device's position and/or auxiliary information to the remote site 156 for additional analysis. The coupling can be through a local area network, or a wide area or global network. The wide area or global network can be a SMS network. The remote site 156 can interface with users through a website. The additional analysis performed by the remote site 156 can include a number of operations, such as labeling the positions of the position-sensing device 102, enhancing the accuracy of the labels and/or positions, or compressing the position and/or auxiliary information received, as, for example, described in U.S. Provisional Patent Application No. 60/404,645, filed Aug. 19, 2002.

Figure 5:
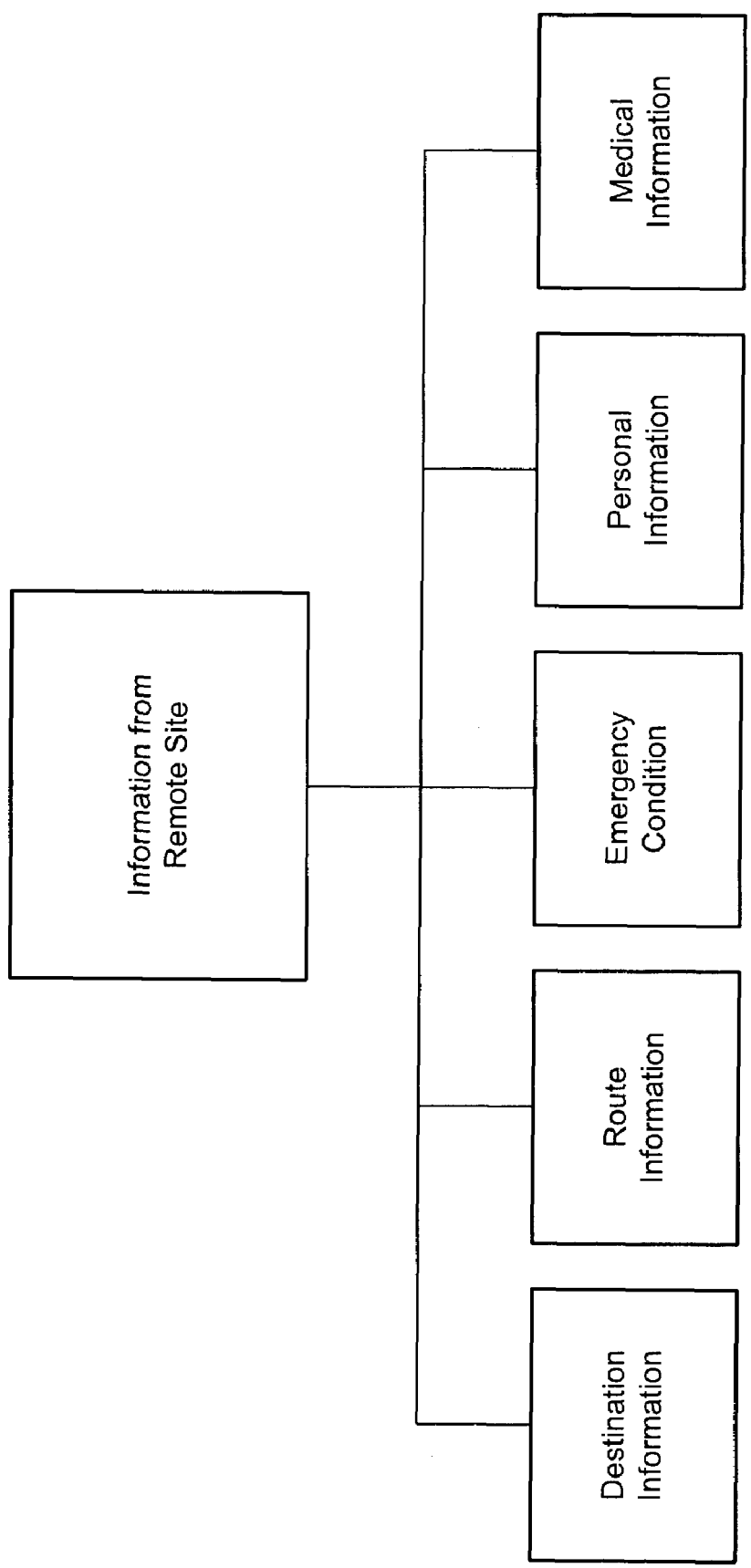
FIG. 5 shows examples of information provided by the remote site of the present invention.

The remote site 104 can also provide information to the position-computing device 110. FIG. 5 shows examples of information provided by the remote site 104. For example, the remote site 104 can provide information regarding the environment of the position-computing device 110, such as information on a destination entered by the user into the position-computing device 110. The destination can be a point of interest. As the user is traveling towards the destination, since the remote site 104 can be made aware of the position of the position-sensing device 102, route information can also be provided to the position-computing device 110. Route information can, for example, depend on pre-programmed maps or include current traffic conditions. For example, an accident has just occurred on the freeway and traffic is held up. Such information can be transmitted to the user. In one embodiment, the remote site 104 can send emergency conditions to the position-computing device 110. For example, any emergency conditions, such as fire, flood and explosion, within a five-mile radius from a position-sensing device will be sent to its corresponding position-computing device 110.

The remote site 104 can provide information regarding a user to the position-computing device 110. The information can be personal to the user of the position-computing device 110. In one example, the information provided by the remote site 104 can be medical in nature. For example, the user's heart beat is irregular and there is a hospital close to where the current position of the user. The remote site 104 can suggest that the user visit the hospital, and provide the user with the corresponding directions. The hospital can also be notified of the imminent arrival and/or condition of the user by the remote site 104 or the position-computing device 110.

Figure 6:
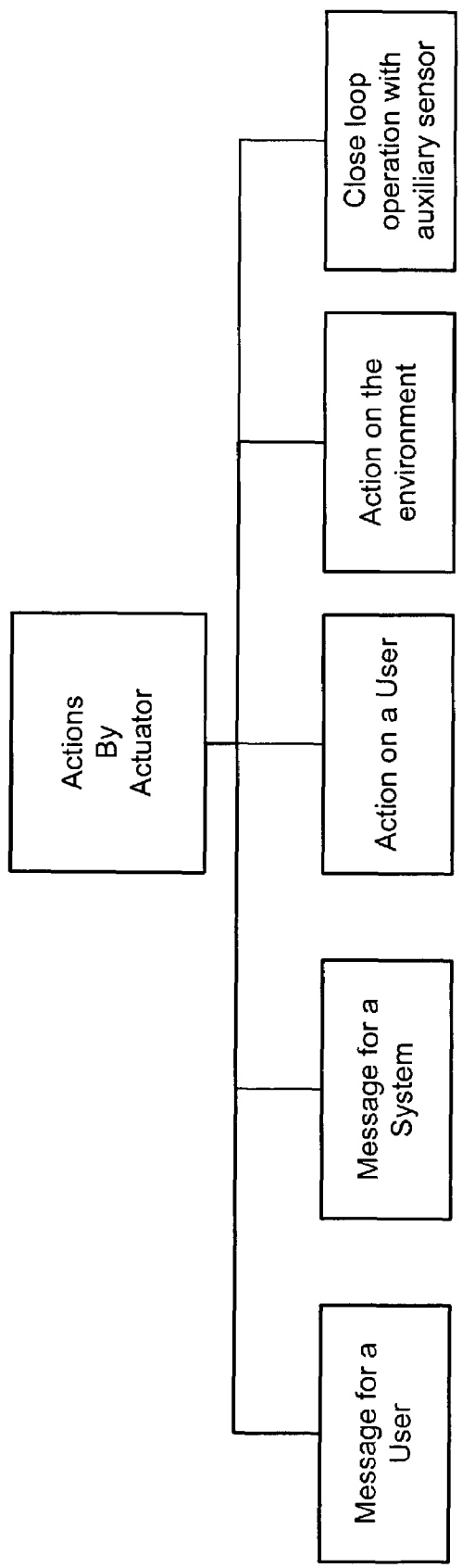
FIG. 6 shows examples of actions performed by an actuator of the present invention.

In one embodiment, the position-computing device 110 is also coupled to the actuator 106. In view of an analysis performed by the position-computing device 110 and/or the remote site 104, the actuator 106 can be controlled to perform an action. FIG. 6 shows examples of actions performed by the actuator 106. In one embodiment, the action is a message to a user of the position-computing device 110 or to another person. The message can include text, audio or graphics. The message can describe certain actions the recipient should perform. The message might simply be an alarm, which can be a flashing red light or an audible tone. The action performed by the actuator 106 can also be a message for a different system. Based on the message, the different system can initiate an action.

In another embodiment, the action performed by the actuator 106 can be an action directly on a user. For example, in view of auxiliary information regarding the user's glucose level, the actuator 106 can inject small doses of insulin into the user's blood stream.

In still another embodiment, the action performed by the actuator 106 is an action on the environment or the surroundings in the vicinity of the position-sensing device 102. For example, the action can be increasing the power to a heater to increase temperature, or to speed up a fan to decrease temperature.

Auxiliary sensors and actuators can work in a closed-loop situation so as to reach a pre-set point. For example, as a temperature sensor monitors the temperature of an environment, an actuator adjusts the speed of a fan or the power to an air-conditioner until a certain optimal or pre-set temperature is reached.

Figure 7:
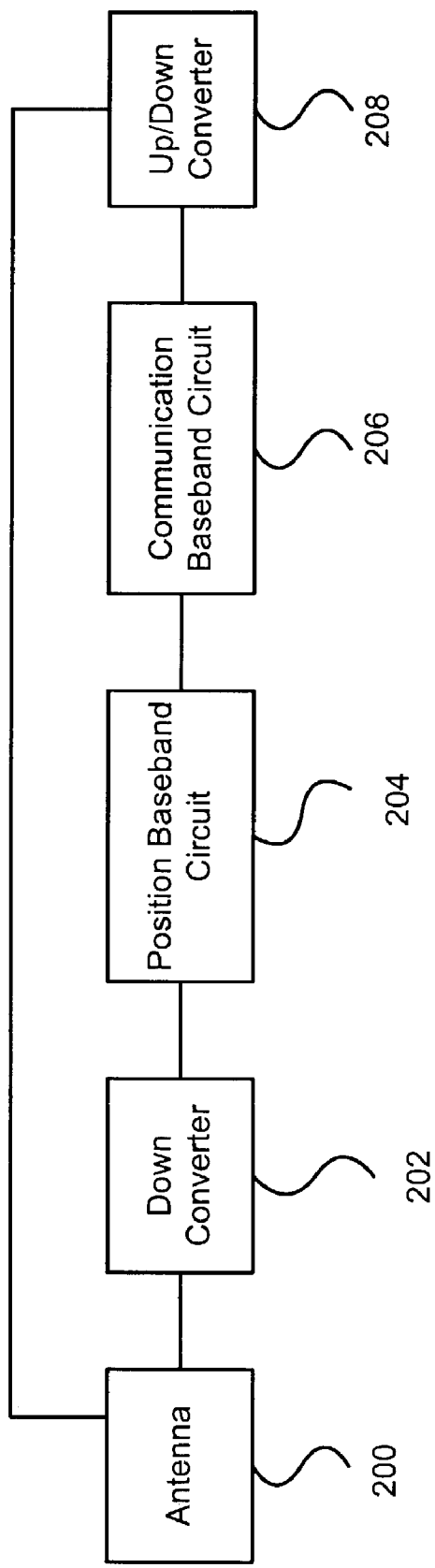
FIG. 7 shows one embodiment of the position-sensing device of the present invention.

FIG. 7 shows a position-sensing device according to one embodiment of the invention. The position-sensing device shown in FIG. 7 is suitable for use as the position-sensing device 102 shown in FIG. 1. The position-sensing device includes an antenna 200, a down converter 202, a position baseband circuit 204, a communication baseband circuit 206, and an up converter 208. The up converter 208 may also serve as a down converter in another embodiment. Under that situation, the up converter 208 can be known as an up/down converter. The following description is directed towards an embodiment that makes use of GPS to sense position, but it should be understood that the position-sensing device could use other technologies besides GPS.

In one embodiment, the antenna 200 receives GPS RF signals and can also receive and transmit communication RF signals. After GPS RF signals are captured, the down converter 202 down-converts such signals received from the antenna 200 to lower frequency signals or baseband signals for further processing.

The position baseband circuit 204 extracts raw position data from the GPS baseband signals. The raw position data are related to the pseudo-ranges from GPS satellites. Typically, a GPS baseband processor uses a digital signal processor core, which controls a set of GPS correlators. These correlators are usually set up to acquire and track the GPS satellite signals so as to produce the raw position data.

In one embodiment, raw position data are pseudo-ranges. Pseudo-ranges are typically estimates of distances between position-sensing devices and GPS satellites. In another embodiment, raw position data are from signals captured by the position-sensing device, but are less processed than pseudo-ranges. For example, as the GPS signals are received from the satellites, the position-sensing device does not perform the tracking calculations needed to maintain a closed tracking loop. Instead, the tracking calculations are performed by the position-computing device to generate, for example, pseudo-ranges, which are then used to generate a position. In this example, raw position data sent to the position-computing device are less processed than pseudo-ranges. The position generated can be, for example, the longitude and latitude of the position. In yet another embodiment, raw position data are information that needs additional processing before their corresponding position, such as its longitude and latitude, can be identified.

In one embodiment, the position-sensing device does not convert the raw position data to identify the position of the position-sensing device. Instead, the raw position data are sent to the position-computing device 110, which will then compute a position based on these data. In another embodiment, these raw position data can be sent, via cellular link, to remote servers for position calculations. In either case, the position-sensing device does not have to perform the intensive position computations requiring processing capability from additional circuitry and consuming more power.

Figure 8:
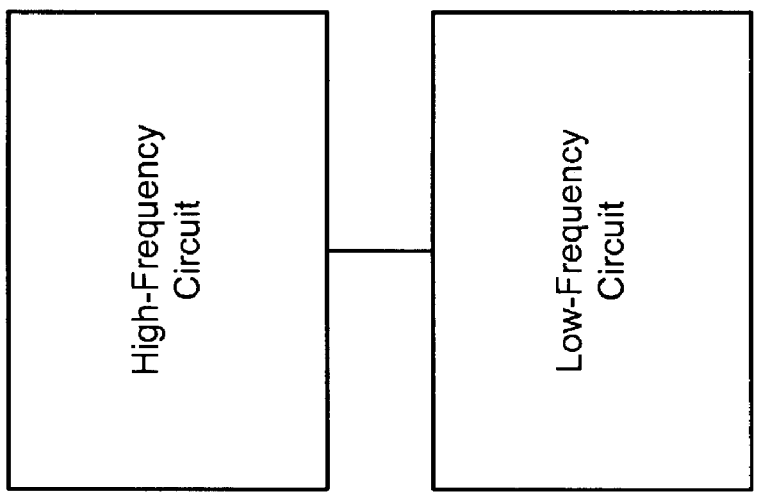
FIG. 8 shows one embodiment of the position-sensing device of the present invention having a high-frequency and a low-frequency circuit.

In one embodiment, to minimize space, and to reduce power consumption under certain circumstances, many components shown in FIG. 7 in the position-sensing device are integrated into a high-frequency circuit and a low-frequency circuit (FIG. 8). Sometimes, the high-frequency circuit can be called the analog circuit, while the low-frequency circuit, the digital circuit. For example, the GPS down converting and the communication up/down converting functions are integrated into the high-frequency circuit; and the position baseband circuit and the communication baseband circuit are integrated into the low-frequency circuit. The high-frequency circuit can be on a chip or substrate, and the low-frequency circuit can be on another chip. This results in a two-chip solution for a position-sensing device. In yet another embodiment, all these circuits could be on a common chip where high-speed analog circuits and digital circuits operate satisfactorily on the same substrate. If the antenna is an integrated-circuit antenna, to reduce loss, the antenna may not be on the same substrate as the other circuits, but can be on a separate low-loss material. In another embodiment, a chip or a substrate can be a circuit board instead.

Figure 9:
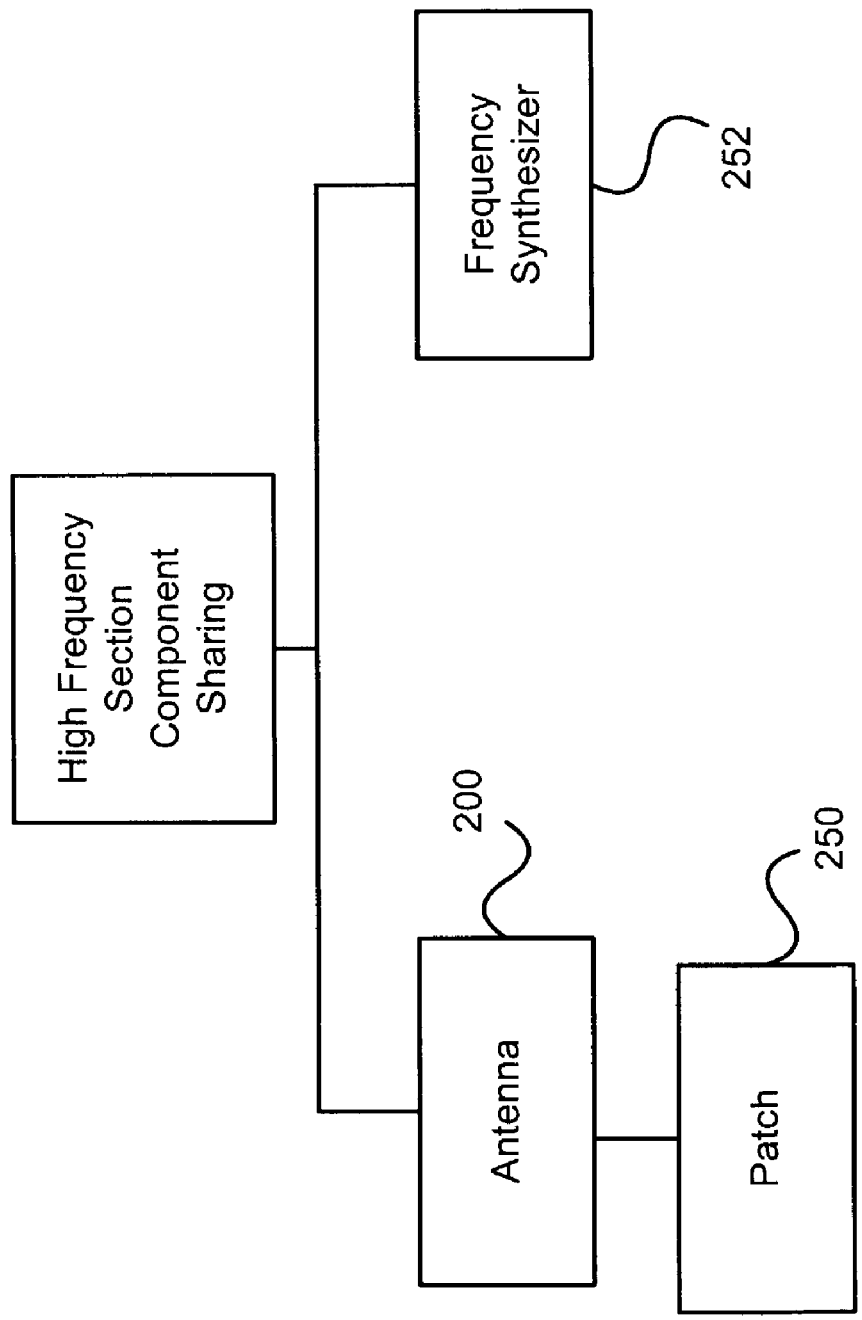
FIG. 9 shows examples of component sharing in the high-frequency section of the position-sensing device of the present invention.

Certain components in the high-frequency section of the position-sensing device can be shared. FIG. 9 shows examples of such sharing. Both the GPS RF signals and the communication RF signals can share the same physical antenna 200. In one embodiment, the antenna 200 can be a patch antenna 250. Both the GPS RF signals and the communication RF signals can also share the same frequency synthesizer 252, locked to a common timebase such as a crystal oscillator.

Figure 10:
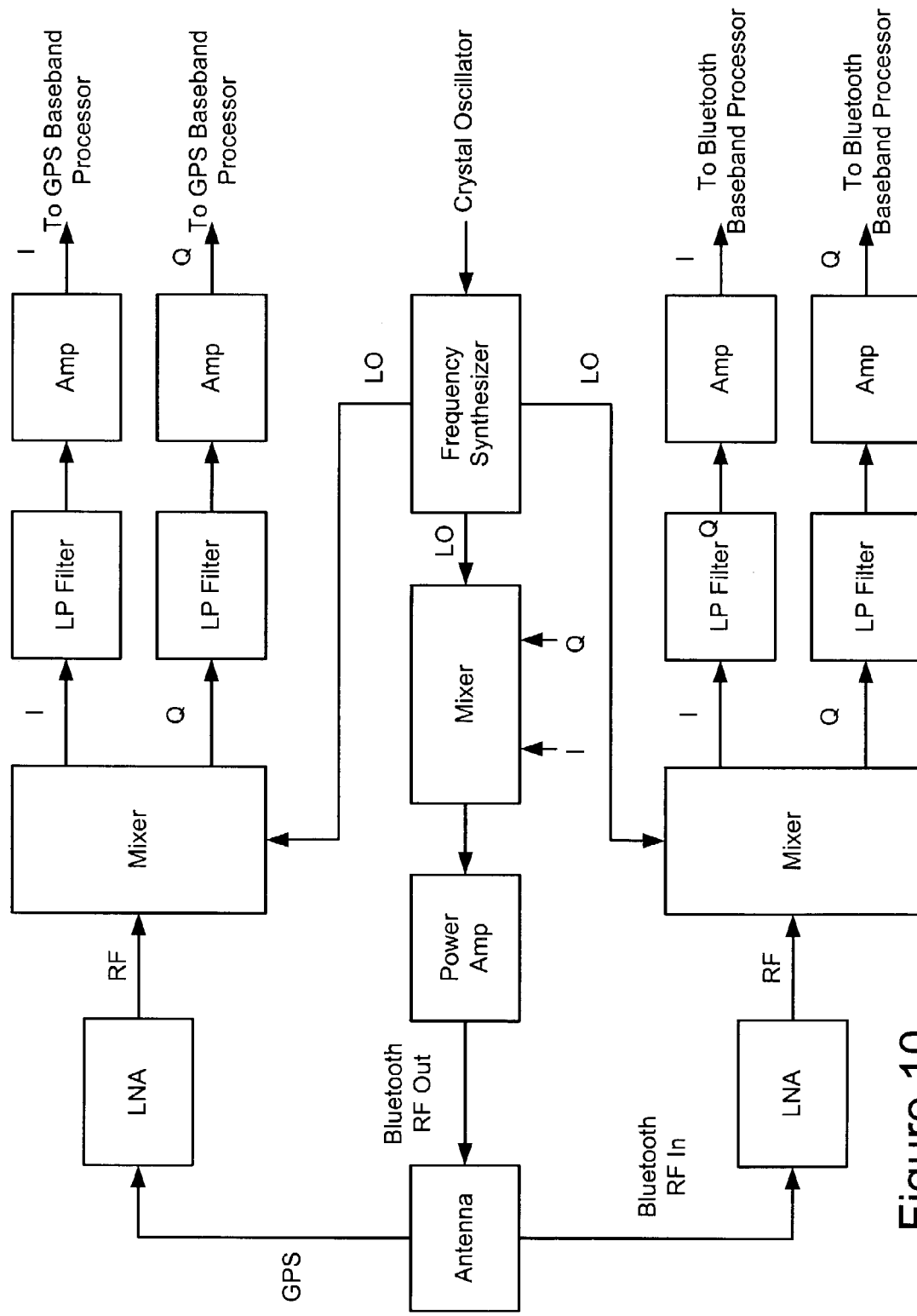
FIG. 10 illustrates one example of a high-frequency circuit of the position-sensing device of the present invention.

FIG. 10 shows one embodiment of the high-frequency circuit, using GPS and Bluetooth to illustrate different features. First, regarding the signal path of the GPS signals, an antenna receives the GPS RF signals, which are then amplified by a low-noise amplifier (LNA). The subsequent RF signals are down-converted to lower or baseband frequencies. This can be done by a mixer that mixes the RF signals with a LO signal from a frequency synthesizer. The mixer can be an image-reject mixer. The frequency synthesizer can be controlled by a temperature-compensated voltage-controlled external oscillator or timebase, which can be a crystal oscillator. The mixer output typically includes two signals, I and Q signals, which are in phase quadrature with each other. Both signals are amplified and then sent to a GPS baseband processor.

For the Bluetooth signals to be transmitted by the position-sensing device to the position-computing device, a mixer receives the I and Q signals from a Bluetooth baseband processor. The mixer, serving as an up converter, converts the two sets of signals to RF signals by mixing them with a LO signal from the frequency synthesizer. The communication RF signals are then amplified by a power amplifier to generate the Bluetooth RF output signals. The antenna then transmits the RF output signals to the position-computing device.

The position-computing device can also send Bluetooth RF input signals to the position-sensing device. This can be, for example, control signals for power conservation, configuration or other functions. Other functions can include initiating an action of accessing raw position data, or transmitting data to the position-computing device. As shown in FIG. 10, the Bluetooth RF input signals can go through similar signal processing as the GPS RF signals, but the I and Q signals are transmitted to the Bluetooth baseband processor. In this case, the mixer along the signal processing path can serve as a down converter.

A number of components are not shown in FIG. 10. For example, a mode switching circuitry with 3-wire bus input can be used to control the different modes of operation. In addition, there can be on-chip diplexers to control signal traffic for the different modes. There may be other passive components like filters for processing the RF and baseband signals.

Figure 11:
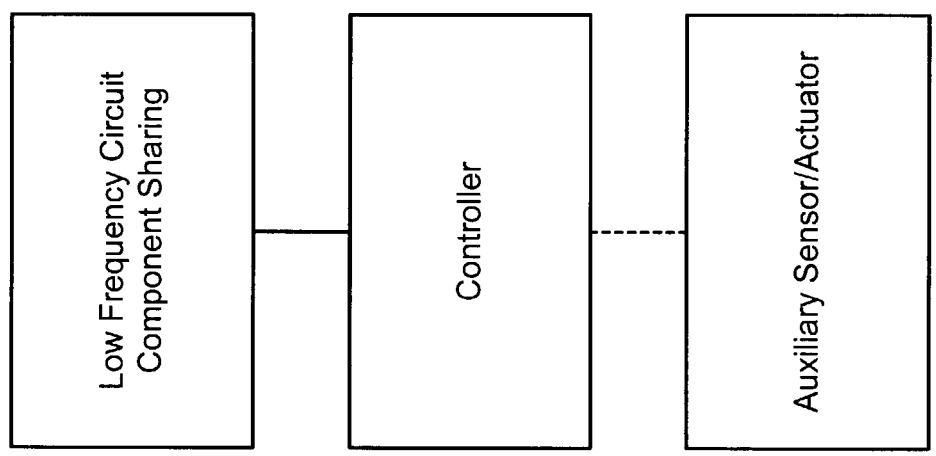
FIG. 11 shows examples of component sharing in the low-frequency circuit of the present invention.

Similar to the high-frequency circuit, certain components in the low-frequency circuit can be shared. FIG. 11 shows examples of such sharing. The communication signals and the GPS signals may share the same controller. An auxiliary sensor or an actuator can also share a controller.

Figure 12A:
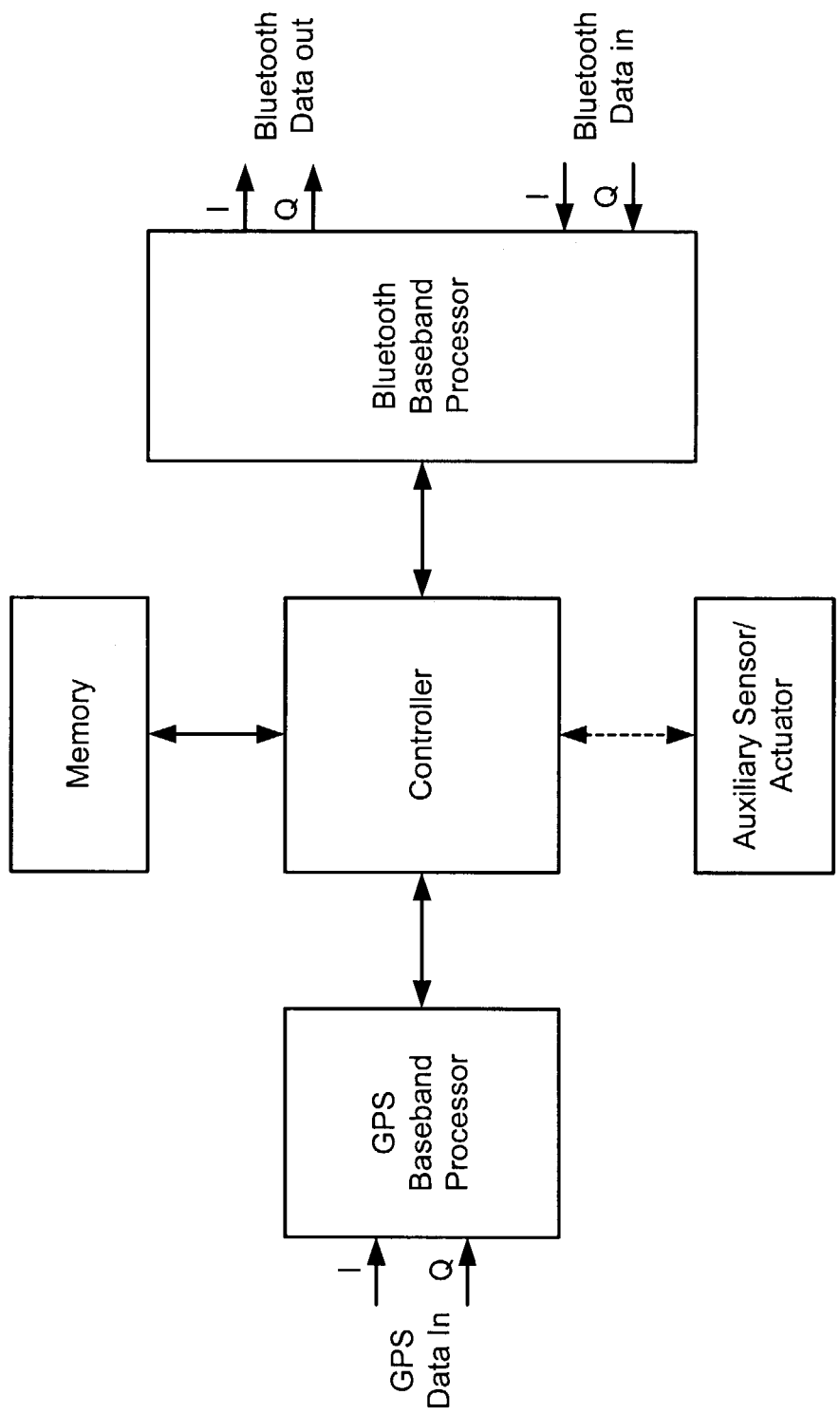
FIG. 12A shows one embodiment of low-frequency circuit of the position-sensing device of the present invention.

FIG. 12A shows one embodiment of the low-frequency circuit, again using GPS and Bluetooth to illustrate different features. The GPS baseband processor receives and analyzes the GPS quadrature data, the I and Q signals. The GPS baseband processor is controlled by a controller with on-chip memory.

The Bluetooth baseband processor receives and analyzes the Bluetooth quadrature data from the Bluetooth RF input signals. The Bluetooth baseband processor is also responsible for generating the Bluetooth quadrature data, the I and Q signals, for the Bluetooth RF output signals. The Bluetooth baseband processor is controlled by the controller. The controller can have a separate and dedicated communication processor. In such a case, the logic circuitry of the controller will be simplified.

The controller can also be used to control one or more auxiliary sensors and/or one or more actuators. These auxiliary sensors and/or actuators can be integrated to the circuits of the position-sensing device, such as the low-frequency circuit, or can be on separate circuits/chips, or can be external to the device.

Figure 12B:
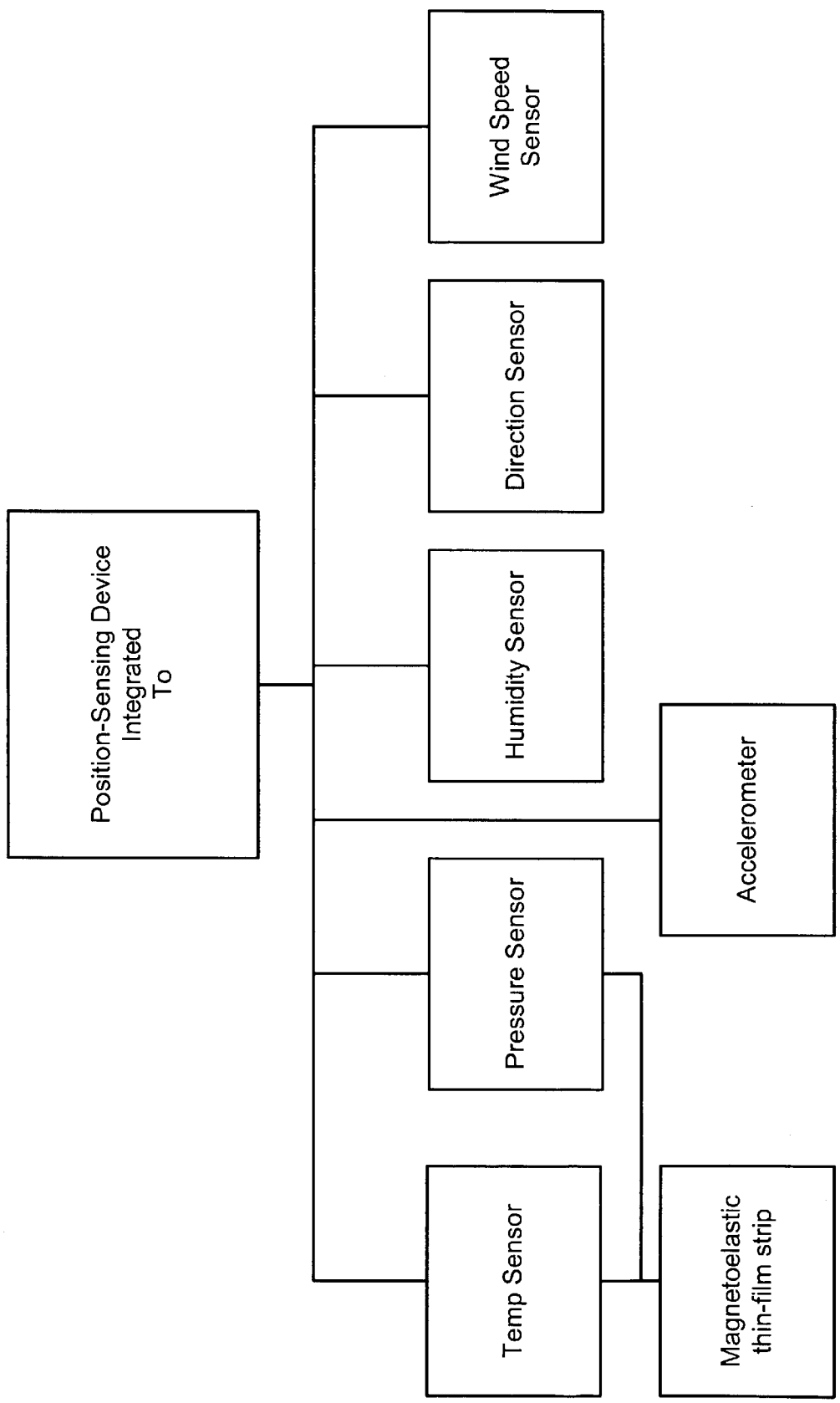
FIG. 12B shows examples of integrating a position-sensing device with different types of auxiliary sensors.

FIG. 12B shows examples of integrating a position-sensing device with one or more different types of auxiliary sensors. Other types of auxiliary sensors can be integrated. FIG. 12B provides examples for illustration purposes. The device can be integrated to a temperature sensor, a pressure sensor, an accelerometer, a humidity sensor and a wind speed sensor. The integration can be through integrated-circuit techniques, such as having one or more of auxiliary sensors on the same integrated circuit as the position-sensing device. Or, the integration can be through packaging, where one or more auxiliary sensors are in the same package as the position-sensing device.

An example of a temperature sensor is a magnetoelastic thin-film strip. The material's magnetic response changes when it is heated or cooled. A magnetoelastic thin-film strip can also be used as a stress sensor, again through monitoring its magnetic response. Such a strip can be, for example, one inch in length.

In another embodiment, two or more different types of auxiliary sensors are integrated together, without a position-sensing device.

Figure 13:
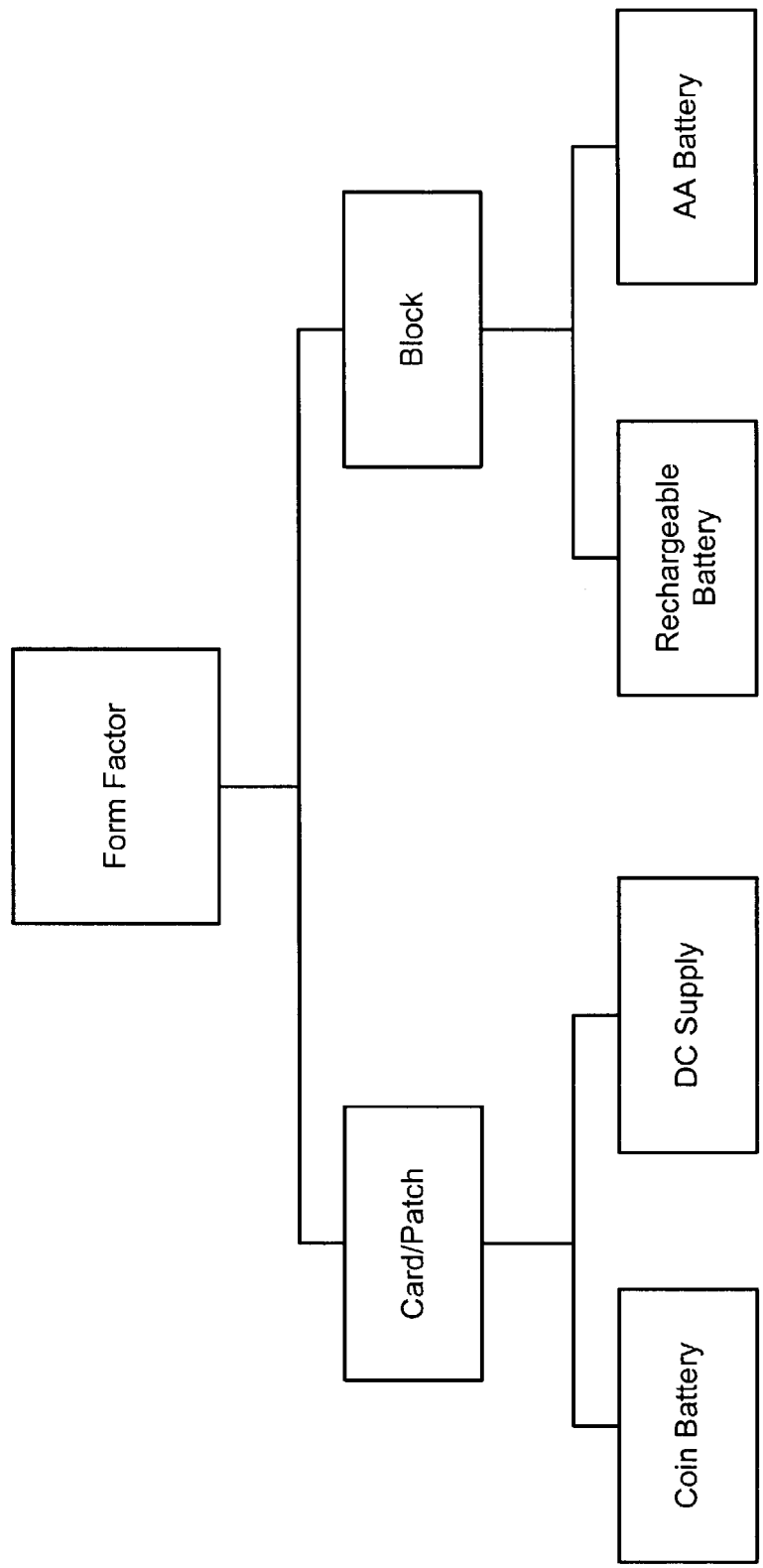
FIG. 13 shows examples of the position-sensing device form factor of the present invention.

The position-sensing device can be made relatively compact, enhanced through circuit integration. FIG. 13 shows examples of the position-sensing device form factor. The position-sensing device can be the size of a patch or a card (e.g., memory card or PC Card). The antenna can be a patch antenna. A patch can be a structure whose thickness is less than 0.5 inch and whose surface area is less than 2 square inches, or more preferably 1 square inch. In this situation, power can be from a dc power supply or a battery (e.g., coin battery). The dc power supply can be from the cigarette lighter outlet of a car or from an ac outlet with an external transformer. Certain features described in U.S. Provisional Patent Application No. 60/404,645, filed Aug. 19, 2002 can be incorporated into the position-sensing device to reduce power consumption.

In another embodiment, the size of the position-sensing device is thicker, more in the shape of a block. In this situation, the size is influenced by the size of its power source. For example, power can be from a rechargeable battery or from AA batteries.

Figure 14:
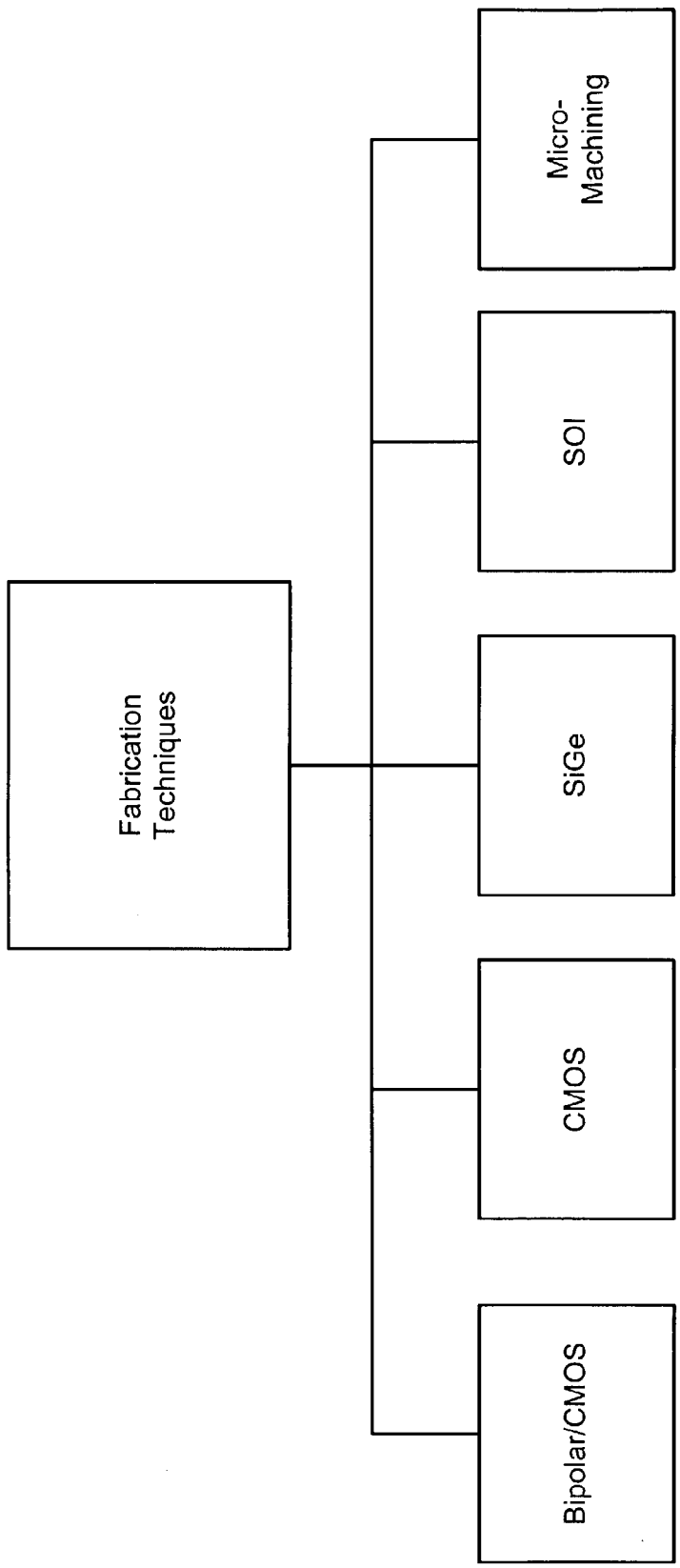
FIG. 14 shows examples of fabrication techniques for the present invention.

Different techniques may be used to fabricate different circuits described. FIG. 14 shows a few examples. The high-frequency circuit can be fabricated by bipolar processes, while the low-frequency circuit by CMOS processes. In one example, both the high and low frequency circuits are fabricated by CMOS processes. Other processing technologies can be used, such as BiCMOS, SiGe or SOI (Silicon-On-Insulator).

In one approach, an auxiliary sensor includes a mechanical device that can respond to mechanical forces. It can be fabricated by micromachining techniques. Devices made by micromachining techniques can also be known as microelectromechanical systems or microsystems. The micromachining techniques include semiconductor processes. The auxiliary sensor can be integrated with the position-sensing device, such as on the low-frequency chip.

An example of an auxiliary sensor made by micromachining techniques is a pressure sensor. It can include a square membrane bulk-etched in a silicon wafer. This process etches away most of the thickness of a region of the die, called the diaphragm. Then piezoresistive (stress sensing) transducers can be deposited through diffusion to create a resistive bridge type structure. The etching process used to create the thin diaphragm can make the silicon wafer more fragile and susceptible to breakage during handling. To reduce in-process damage, the etch process can be performed as the last major photolithography step. The sensor can then be separated from the wafer, and bonded to a glass or Pyrex plate, or to a ceramics plate to increase its mechanical strength.

Figure 15:
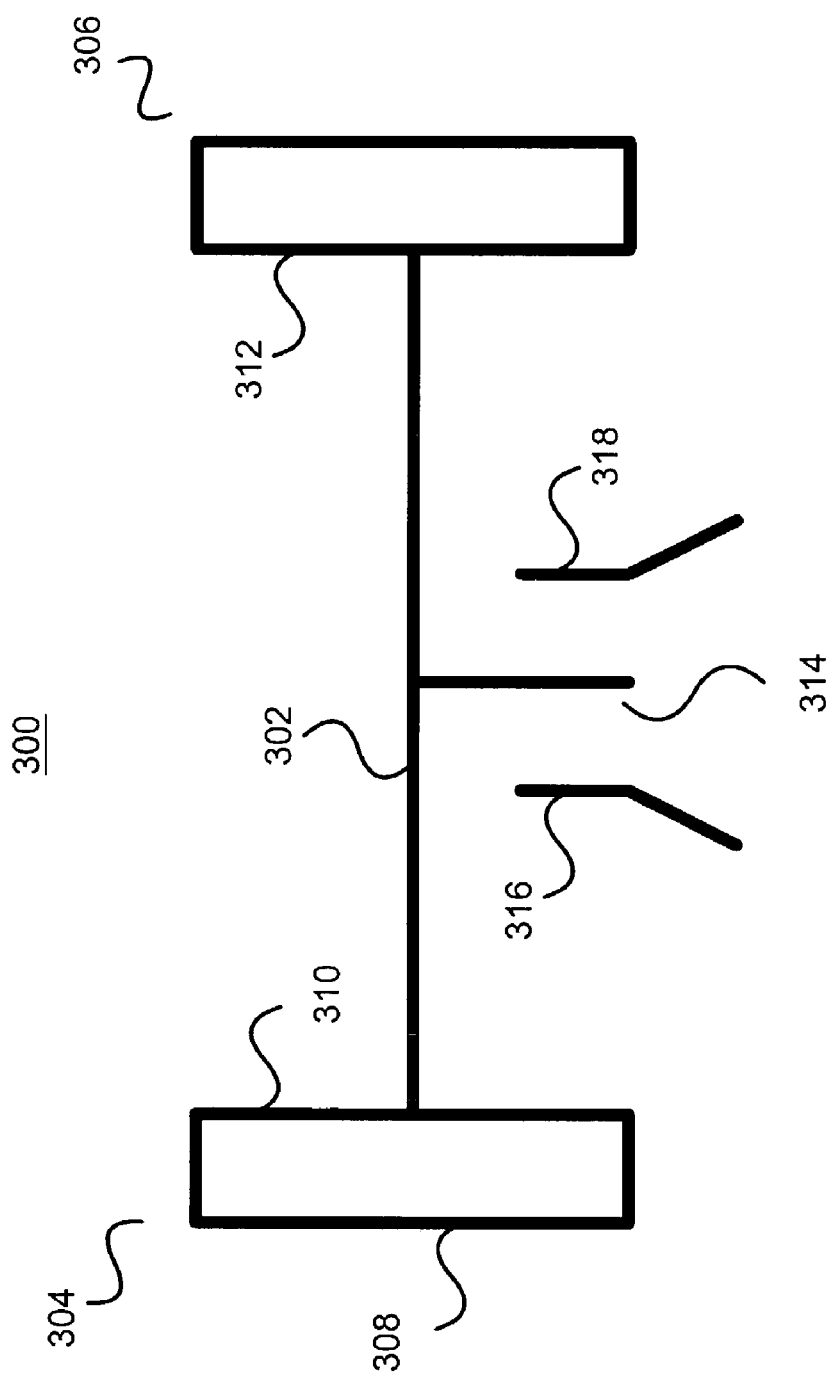
FIG. 15 shows an example of a micromachined accelerometer for the present invention.

Another example of such an auxiliary sensor made by micromachining techniques is a capacitive accelerometer or inertia sensing element. It can be a bulk micromachined capacitive accelerometer on a substrate. FIG. 15 shows an example. The accelerometer 300 incorporates a moving inertial mass 302 suspended by springs attached to a surrounding frame structure, which can be the substrate. There can be two springs 304 and 306, one connected to each end of the moving inertial mass. Each spring can be micromachined beams in the shape of a rectangular box, with two long beams connected at their ends. One of the long beam 308 of the spring 304 is stationary and is attached to the frame structure. The other long beam 310 is a movable or flexible beam. That long beam 310 is connected to one end of the inertial mass 302, whose other end is connected to the long beam 312 that is movable and flexible, of the other spring 306. Again, the other long beam of the spring 306 is stationary and is attached to the frame structure.

The inertial mass 302 has a metallic finger 314. The finger 314 is positioned between two stationary metal bars, 316 and 318, on the frame structure. The distance between the finger 314 and each of the metal bar changes as the inertial mass 302 moves. This creates a variable capacitance between the moving inertial mass and each of the metal bars. There can be many fingers, each positioned between two bars, so as to have higher capacitance. To measure two axes of acceleration, two such accelerometers, positioned orthogonal to each other, can be used.

Yet another example of an auxiliary sensor made by micromachining techniques is for measuring information regarding a living being. In one embodiment, sensors made by such techniques can take very small amount of materials from the being as samples for measurement.

The auxiliary sensor may not have to include a mechanical device. For ease of integration, such auxiliary sensors can be fabricated by semiconductor processing techniques similar to those used in the position-sensing device. For example, the auxiliary sensor is a temperature sensor implemented with a diode. The diode can be fabricated on the same piece of substrate as the low-frequency circuit of the position-sensing device. Assume the circuits of the device are in an enclosure. The temperature gradient between the inside of the enclosure and the outside ambient of the position-sensing device can be calculated or measured. The temperature as measured by the diode on the substrate can be calibrated to subtract out the gradient. This will more accurately reflect the outside ambient temperature. In one embodiment, the temperature sensor is implemented with a thermal couple.

The auxiliary sensor can be in the same package as the position-sensing device but not share the same substrates as the circuits in the position-sensing device. For example, the temperature sensing diode can be separately encapsulated or enclosed, with the enclosed diode exposed to the outside environment, and with its leads bonded to circuitry in the position-sensing device. As another example, the geometry of the auxiliary sensor can be much bigger than the numerous circuit components of the position-sensing device. To illustrate, the diaphragm in a micromachined pressure sensor can occupy significant area. This area can be quite expansive if it is on the substrate of the low frequency circuit of the device. Hence, the auxiliary sensor can be on a separate substrate or circuit board.

In one embodiment, different chips or circuit boards described are stacked, one on top of the other, instead of having one substantially on the same plane as the other.

In yet another embodiment, an actuator also includes a mechanical device that can exert mechanical forces, and is fabricated by micromachining techniques. For example, the micromachined actuator is for administering small doses of insulin into a person's blood stream.

In one embodiment, some of the high-frequency components in the device are also fabricated by micromachining techniques.

In one approach, the micromachining process is a bipolar process. In another, it is a CMOS process. In yet another approach, it is a BiCMOS process.

In one embodiment, a position sensing system can include more than one type of position detection mechanisms. Such a system can be known as a multi-type position sensor. For example, two types of position detection mechanisms can be a GPS sensor and a RF ID tag. In one embodiment, the RF ID tag can be integrated with circuitry of the GPS sensor. In another embodiment, the GPS sensor and the RF ID tag are on separate substrates or circuit boards, or in separate enclosures. In yet another embodiment, the RF ID tag is on a plastic substrate. The GPS sensor can provide more coarse position information, while the RF ID tag provides finer position information. In another example, the GPS sensor can provide position information in an outdoor environment, while the RF ID tag can provide for position information in an indoor environment, such as a large warehouse. The multi-type position sensor can include a position-sensor selector. When the multi-type position sensor is in transit from one warehouse to another, the selector activates the GPS sensor to track position. When the multi-type position sensor is moved into a warehouse, the selector would select the RF ID tag to take over the position-sensing responsibility. As another example, two types of position detection mechanisms can be a GPS sensor and a local wireless network sensor (e.g., Bluetooth or Wi-Fi transceiver). In one embodiment, a multi-type position sensor, or at least the GPS sensor within the multi-type position sensor, extracts raw position data, but does not convert the raw position data into the position of the multi-type position sensor.

Figure 16:
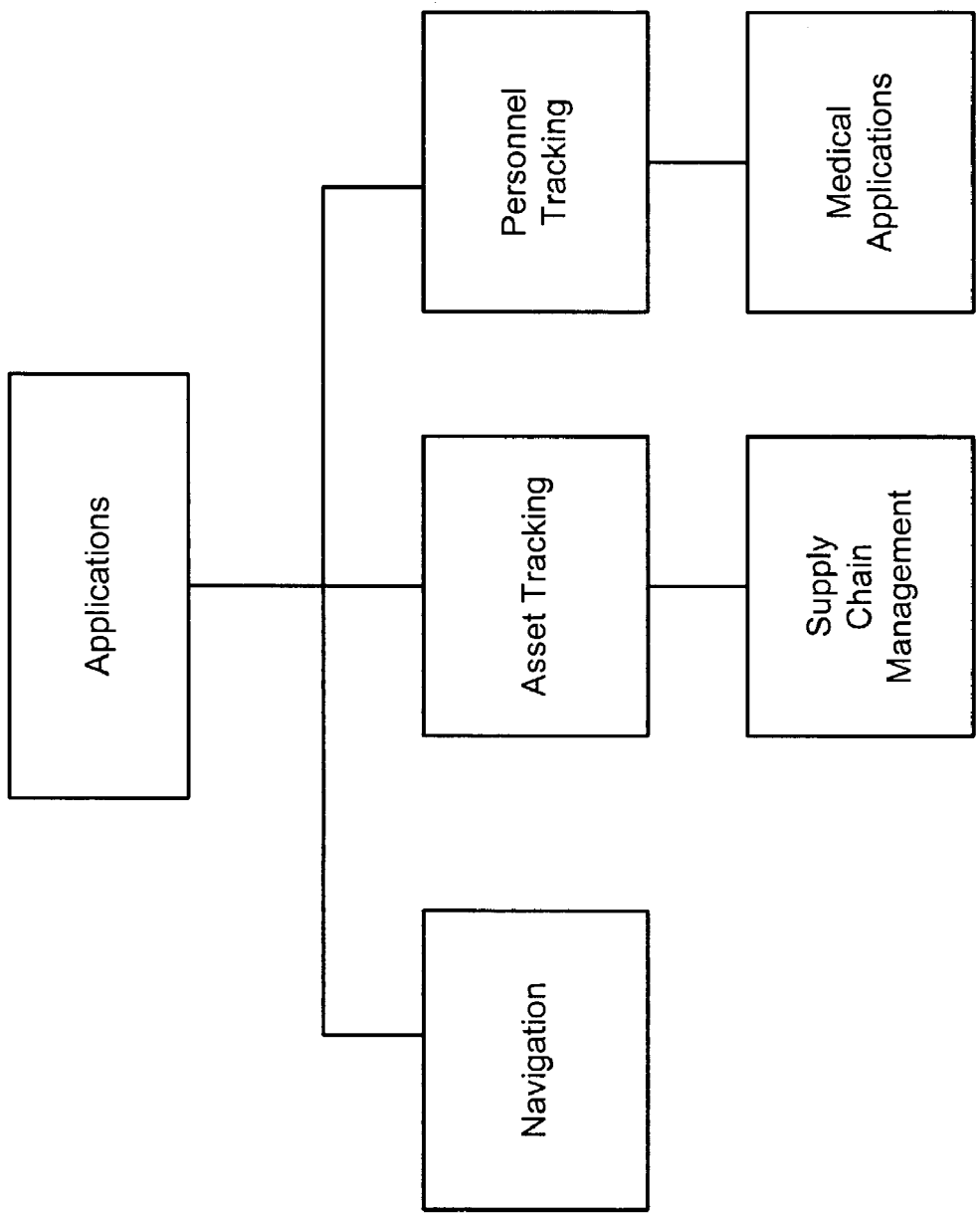
FIG. 16 shows examples of applications for the present invention.

FIG. 16 shows a few examples of applications for the present invention. One application is in navigation. The position-sensing device can be attached to the top of the dashboard or to the rear window of a car. The position-computing device can be a PDA next to the driver or in the driver's pocket. The PDA can contain a navigation program that performs route calculations, based on user input (e.g., a destination location), with a map database stored in the PDA's memory. The map may be downloaded from a remote site. The downloading can be performed before or after the destination position has been entered into the PDA. The navigation program allows the driver or a passenger to enter a destination position, e.g., in the format of a street address or a point on a map display. The program then can compute a route based on the map database to guide the driver to that destination. Such guidance can be in the form of turn-by-turn voice instructions. As an example, a car rental company can incorporate such technologies into its car rental policy and offer them as an additional feature.

Another application is in the area of asset tracking and management. A cost-effective asset tracking system can be built based on a number of embodiments described. For example, a position sensor can include a low-cost GPS position-sensing device and a position-computing device (e.g., PDA with cellular or other wireless communication ability). The position-computing device can also be wirelessly connected to a remote station or site.

In one embodiment, products/materials can be tracked by a position sensing system. This can be used in supply-chain management. When a product requires multiple parts/materials to be assembled or integrated together, to have each of the right parts/materials available at the appropriate time is sometimes critical to success. To reduce total costs, a company has to control the amount of materials/parts at rest (inventory) and the speed and costs of materials/parts in motion (freight). If different parts/materials come from different channel partners, to control cost, the company may want to work with their partners to keep their assets (the parts/materials) moving to the company at the minimum level needed to keep customers satisfied. To achieve that, the company should know where the different parts/materials are and to control the rate they are transported. Not only would this help the company lower its expense by reducing its inventory, the company can better satisfy its customers with sufficient inventory.

A piece of inventory can be in freight or it can be in a large warehouse. Sometimes, the piece of inventory has to be tracked in both situations. In one embodiment, the position sensing system can include two types of position sensors—a multi-type-position sensor. One position sensor (a GPS sensor) is for sensing the inventory when it is being transported from an airport to a warehouse, and the other (such as a RF ID tag or a bar code) for sensing its location inside the warehouse. In another embodiment, a piece of large inventory can include many sub-pieces. The piece of inventory can be tracked by a GPS sensor, and may also be tracked by a RF ID tag. Once inside the warehouse, the piece of inventory can be transported to a center, where it is unpacked, with a number of the sub-pieces separately distributed through the warehouse. Each sub-piece can be identified and tracked within the warehouse by its individual bar-code or RF ID tag.

The inventory location information can be wirelessly entered into a warehouse management system, which allows users to see the status of incoming goods, outgoing shipments, and available inventory. Reports can also be generated. The warehouse management system can allow the inventory to be managed in real time. Such information is useful for procuring, maintaining, transporting and delivering products through every stage of production from the source of supply to the final point of consumption. Such information could also assist in providing an audit trail for accounting purposes.

The above embodiments describe tracking inventories, such as, by the management. However, a consumer can track a piece of inventory as well. A typical supply chain includes four entities—manufacturer, wholesaler, retailer and consumer. In one embodiment, a consumer can drive what a manufacturer should produce and ship. For example, the consumer can get in touch with the call center of the retailer, or enters his request into the retailer's web site. Such a request can directly go to the manufacturer, which would assemble the product to be shipped to the consumer. Based on a number of the embodiments of the present invention, the consumer can track the location of his request in real time, such as through a web site. Thus, the consumer directly drives what should be produced and shipped, and tracks his shipment, from inside a warehouse to his door step.

Another example of involving a consumer is for products at least partially assembled by the consumer. A retailer can have thousands of components in the store. It is up to the consumer to pick and choose the components desired for subsequent integration. If the consumer selects two components, manufactured by two different manufacturers. The retailer can place the order to the two manufacturers. One goal of the retailer may be to ensure that both components arrive around the same time at the retailer's store. The two components can be ready for shipment at different time. Or, the two components can arrive at different time frames, even if they are shipped at the same time. This can be due to differences in locations or differences in delivery method. One approach to achieve the retailer's goal is to allow the component that needs more time (long-time component) before reaching the retailer dictate the delivery of the other component. For example, when the manufacturer of the long-time component is ready to ship its component, that component is shipped, with its position tracked by an embodiment of the present invention. Only when the long-time component is within a certain distance to the retailer, the retailer initiates the delivery of the other component. In other words, the retailer (or the system automatically) changes the delivery time of the other component based on the position of the long-time component. When both components arrive, the retailer/system can notify the consumer.

In tracking assets, a position sensor can include additional auxiliary sensors, such as temperature and humidity sensors. The following illustrates an example of asset tracking based on a position sensor and an auxiliary temperature sensor. Assume that a company needs to produce a product that requires two very expensive parts to be integrated together at a warehouse. One part is manufactured by a local sub-contractor. The other part is from a remote sub-contractor thousands of miles away. This other part is also temperature sensitive. Due to cost and liability, the company does not want to order and store any one of the two parts in the warehouse unless the product has to be produced. Assume an order is received for the product. The company has a supply-chain management controller, which can include a warehouse management system. The controller automatically requests the sub-contractors to make and ship the parts so that the company can produce the ordered product as needed.

Assume the temperature-sensing part is ready and is shipped first. Once shipped, the controller tracks the temperature-sensitive part in motion based on a position sensor. The controller is also aware of the temperature of the ambient surrounding that part based on an auxiliary sensor. Assume the temperature-sensitive part becomes defective during shipment due to accidental temperature rise, even though the part is still thousands of miles away from the company. Since the temperature sensor sends information to the controller, the controller is aware that the temperature-sensitive part has to be replaced. Based on such information, the controller automatically orders the local sub-contractor to hold delivery of its part, until the remote sub-contractor is ready to ship a new temperature-sensitive part to the company.

Such real-time location and/or auxiliary information notification and control are very helpful for a company to manage its inventory. Such information is not only applicable to asset tracking/management, supply chain management or product management, but also can be applied to enterprise resource planning and customer relationship management. For example, in customer relationship management, a call center support staff can inform a customer of the location and condition of her product. Alternatively, a customer can access real-time information (e.g., location and condition) via a web interface or by receiving notifications (e.g., email notifications).

Personnel tracking can be another application. For example, additional auxiliary sensors such as body temperature or blood oxygen sensors, or heart-beat monitors can provide important physical health parameters to interested persons (e.g., health professionals) wishing to monitor the position and well-being of their clients. Personnel tracking can also include tracking of other forms of living beings, such as animals.

Different examples of sensors have been described. In one embodiment, a sensor not only can sense but can also transmit information regarding an object. For example, the sensor is a RF ID tag with information stored in the tag about an object. The tag can transmit such information to a recipient.

In a number of embodiments, not only can the size of the position-sensing device be made compact, the position-sensing device can be relatively inexpensive. For example, to reduce cost and size, the position-sensing device does not have a display or keyboard entry for user input. Information can be received and transmitted wirelessly. Also, the position-sensing device does not have to include circuitry to perform processing to calculate its position or determine actions.

A number of devices have been described where the position-sensing device is separated spatially from the position-computing device. Alternatively, the position-sensing device and the position-computing device are in one package.

A number of embodiments have been described that include a position-computing device. One embodiment does not include a position-computing device. Instead, its function is performed by a remote site. The corresponding position-sensing device directly communicates with and is controlled by the site. In this embodiment, auxiliary sensors and/or actuators can also communicate with and be controlled by the site. As an alternative embodiment, the position-sensing device can collect information from, and distribute information to, the additional auxiliary sensors and/or actuators. In other words, the position-sensing device communicates with the site on behalf of the auxiliary sensors and/or actuators.

Figure 17:
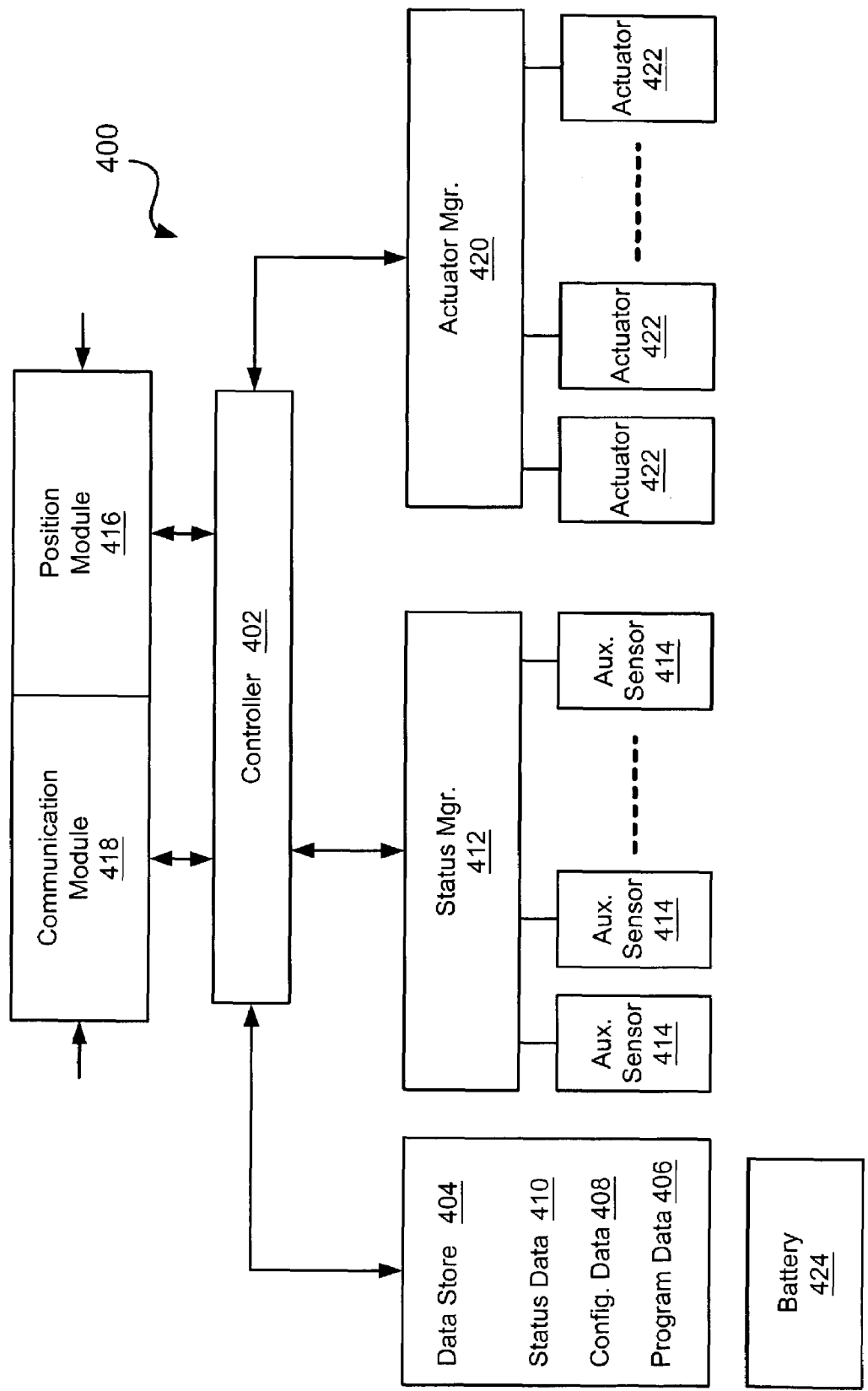
FIG. 17 is a block diagram of a mobile device according to one embodiment of the invention.

FIG. 17 is a block diagram of a mobile device 400 according to one embodiment of the invention. The mobile device 400 is suitable for use as a position sensing system, a medical monitoring device, a position tracking device, or other positioning device.

The mobile device 400 includes a controller 402 that controls overall operation of the mobile device 400. A data store 404 is connected to the controller 402 and provides storage of data. The data stored in the data store 404 can include program data 406, configuration data 408, and status data 410. The status data 410 are data related to the status of an object being monitored, such as position information and/or auxiliary information of the object. The status data 410 are acquired by one or more auxiliary sensors. A status manager 412 couples to the one or more auxiliary sensors 414. The controller 402 interacts with the status manager 412 to obtain the status data 410.

In addition, the controller 402 couples to a position module 416 and a communication module 418. The position module 416 can receive signals that are used to determine a position of the mobile device 400. In one embodiment, the position module 416 is a GPS receiver. The communication module 418 allows the mobile device 400 to communicate in a wireless manner. The wireless communications are over a wireless network (e.g., SMC network, a cellular network, a Bluetooth network, a Wi-Fi network, etc.). The wireless communication capabilities can be used to communicate with a remote server (e.g., send status data to the remote server), sending or receiving messages (e.g., notifications) to other mobile devices, or as an alternative or additional means of determining position.

The mobile device 400 can also include an actuator manager 420 that couples to one or more actuators 422. The actuators 422 can be controlled by the actuator manager 420 to perform an action. The controller 402 interacts with the actuator manager 420 to direct any of the actuators 422 to perform an action. FIG. 6 shows examples of actions that could be performed by the actuators 420. For example, the action is a message to a user of the mobile device 400, another person, a different system, or an action on a user.

The mobile device 400 further includes a battery 424 that supplies power to the mobile device 400. The controller 402, or a power manager (not shown), can also perform power management functions to reduce power consumption and thus extend battery life. For example, circuits or components can be power-off or placed in low-power mode when not active. Further, in one embodiment, the communication module 418 and the position module 416 can share components to reduce cost, die area consumption and power consumption (see, e.g., FIGS. 7-12).

Although the mobile device 400 shown in FIG. 17 includes the status manager 412 and the actuator manager 420, such managers are not required as their operations can be performed by the controller 402. However, when provided, managers can off-load processing from the controller 402 to the managers which reduce processing load on the controller 402. The mobile device 400 can also facilitate power management by separately controlling power to the controller 402 and any managers provided. In addition, the mobile device 400 need not include any of the actuators 422.

Figure 18:
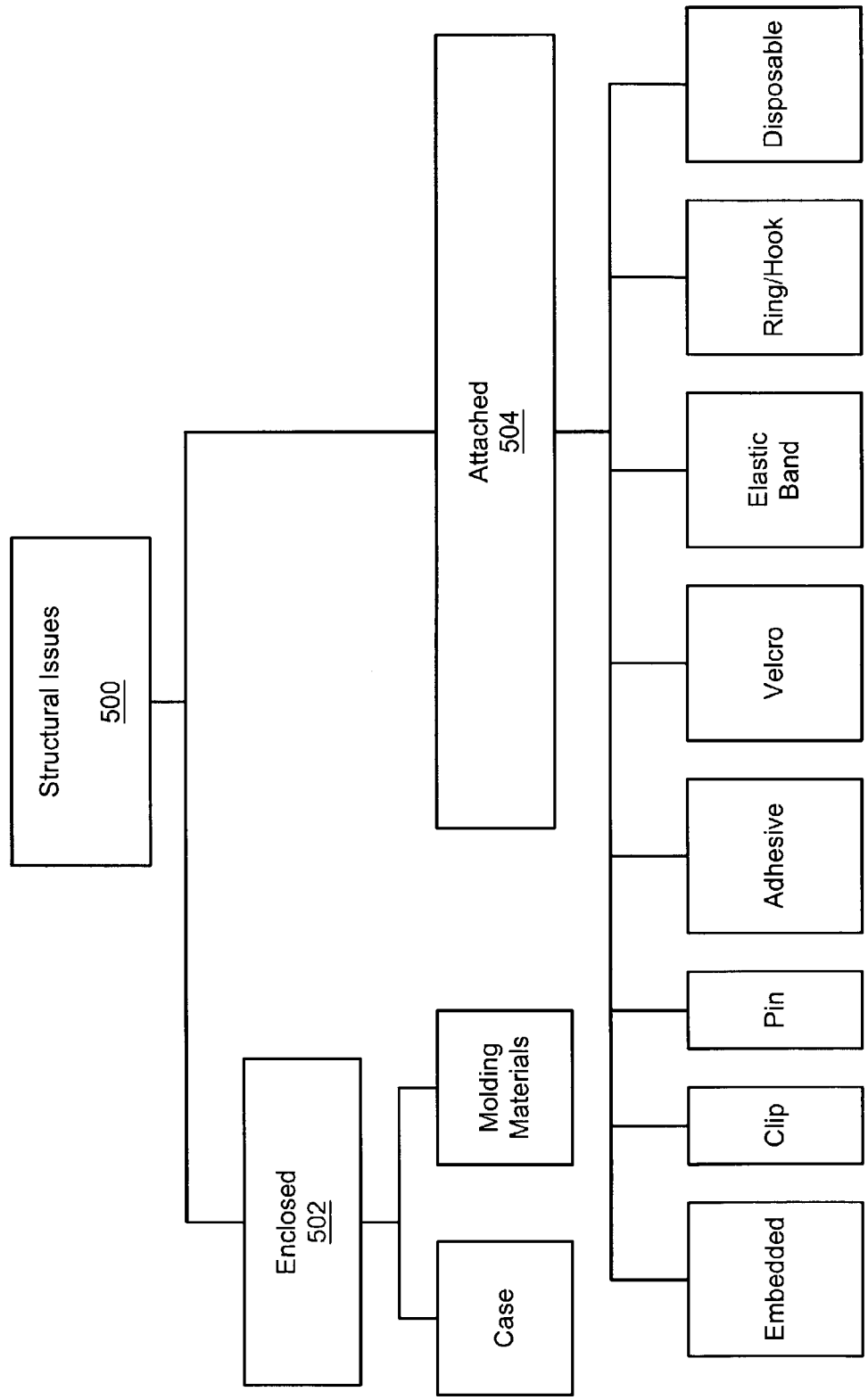
FIG. 18 shows a number of structural issues regarding the devices for the present invention.

As described, a number of embodiments of the present invention can be quite compact. FIG. 18 shows a number of structural issues 500 regarding the devices for the present invention.

The circuits in a mobile device (e.g., a position sensing system, a position sensing device, a medical monitoring device, or a position tracking device) can be encapsulated or enclosed 502 in a number of ways. For example, the circuits can be in a case or housing. The circuits can be enclosed by a molding compound. The molding compound can be epoxy, rubber, plastic or other materials. The enclosed circuits can become the housing of the device.

After the enclosing, the enclosed circuits of the mobile device can be attached 504 to an object (e.g., a package) or a being (e.g., a person) in a number of ways. For example, the enclosed circuits can be in a module, with the module embedded as a unit into the object or being. A being can be a living being or a dead being, for example, a living person or a dead dog. The enclosed circuits can be attached (directly or indirectly) to the object or being through a clip and a pin. The enclosed circuits can be referred to as being wearable. Other attachment techniques include Velcro® and adhesive, either permanently, such as with a glue, or in a non-permanent manner, such as patches that are adhered to the body. The enclosed circuits can be attached with a band, such as an elastic band. The enclosed circuits can be attached by having a ring or a hook. The enclosed circuits can be worn as a necklace, bracelet or other types of fashionable item.

The enclosed circuits can be attached by a mechanism that is designed to be disposed or disposable. For example, the attachment can be through an adhesive tape that has an envelope or pocket. The enclosed circuits can be provided in the envelope, and the envelope can be closed such as by Velcro® or adhesive. The tape can be attached to an object. After finished using the circuits, a user can dispose of the tape, but keep the enclosed circuits.

One embodiment of the invention includes a solar panel. The solar panel can provide electrical power to, for example, a position-sensing device. The solar panel can thus charge a battery used to power the device and/or itself to power the device. When the device is affixed to an object (e.g., a package), the solar panel can remain at least partially exposed to the outside of the object so as to be able to receive light. The solar panel can be integrated with the housing of the device or can be separate and couple to the device via one or more wires (e.g., a cable). For example, the battery 424 of the mobile device 400 can be charged by a solar panel.

In one embodiment, a user can set permission levels. These levels can determine the identity of the person or system that can get information from different embodiments of the present invention, such as a position-computing device, a position-sensing device, a medical monitoring device, a mobile device and/or an auxiliary sensor. The permission levels can also include the time frame when a person or system can get the information. If the user desires, the user can even turn the device off. In that situation, no one has the permission to access information. This can be done, for example, through entering commands into or programming a position-computing device, a position-sensing device, a medical monitoring device, or a mobile device. In another embodiment, the permission can be set at a remote site that communicates with a position-computing device, a position-sensing device, a medical monitoring device or a mobile device.

In yet another embodiment, a position-sensing device or a position sensor is not active until a battery is inserted or a switch is turned on. The device might include a unique identifier, which can be a number. In another embodiment, the device is in a low power mode (e.g. sleep mode) but is programmed to wake up at certain times to listen for commands directed to it. For example, a position-computing device can transmit, through Bluetooth, to the device, a command and the unique identifier, which is used to identify the recipient device of the commands. Once the commands are received, the device becomes active.

Figure 19:
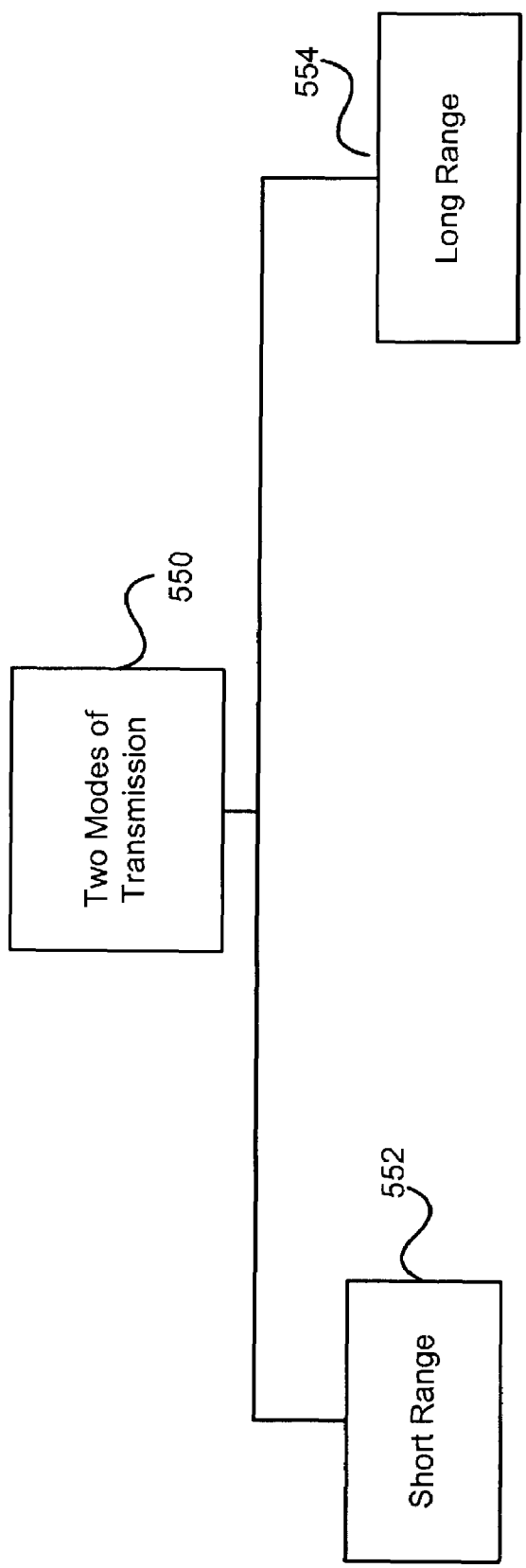
FIG. 19 shows one embodiment of the invention that includes two modes of transmissions.

In one embodiment, a position-sensing device includes two (2) modes of transmissions 550, as illustrated in FIG. 19. Raw position data can be transmitted through either one of the two modes. One mode is short range 552, and the other is long range 554. The short-range transmission is to transmit, such as through Bluetooth, to a receiver in close proximity. Such transmission can be to a position-computing device in its vicinity (e.g., within 30 feet). The other mode is much longer range, such as to a Wi-Fi, cellular, or a pager network. This longer-range transmission consumes more power than the short range transmission. The destination for the long range transmission can be to a remote server. In another embodiment, the short-range transmission can be through Wi-Fi also, while the long-range transmission can be to a cellular or pager network.

In normal operation, the device prefers to transmit and receive signals using short-range communication. In one embodiment, after the position-sensing device has been activated, the position-sensing device starts in a short-range mode. If the position-sensing device is unable to communicate with a recipient or an intermediate system, the position-sensing device can switch to a long-range mode. For example, when the position-sensing device fails to receive either a signal requesting for position information or an acknowledgement to its transmitted signals after a preset duration of time, the position-sensing device will automatically switch to communicate in the long range mode with a recipient (e.g., a remote server). The position-sensing device can then periodically transmit its location to the remote server.

One application of the two modes of transmission is for theft prevention. Imagine a truck shipping a package that has a position-sensing device. During shipment, the position sensing device transmits its position information through short-range communication to a position-computing device attached to the truck. The position-computing device transmits the position of the package to the main office of the trucking company. Unbeknown to the driver, when he is having lunch at a restaurant, a thief breaks into his truck and steals the package. For the next hour, the position-sensing device never receives a signal requesting for location information or an acknowledgement to its transmitted signals. After the hour has elapsed, the position-sensing device can automatically send its unique identifier as a status signal, through a wireless (e.g., cellular) network, to the main office of the trucking company. If the signal is not received, the device can resend the signal every fifteen minutes. The office, after receiving the status signal, can request for the location of the package (i.e., the position-sensing device). The position-sensing device, getting the request, can transmit its location information through the wireless means to the office. Alternatively, the status signal could itself contain the location of the package. In either case, the office is notified of the location and thus is able to track the position of the stolen package.

In another embodiment, instead of transmitting through cellular means, the device transmits information using a Wi-Fi signal to tap into a Wi-Fi network. The Wi-Fi hub receiving the signal can direct it to a predetermined remote site, such as to the main office in the above example. The transmission of information from/to the position-sensing device can also be in a text message format (e.g., email or instant message). For example, the information can be transmitted over a SMS network or other pager type network.

A number of embodiments have been described where positions are identified based on GPS technologies. Other wireless technologies are also applicable, for example, using the techniques of triangulation. In one embodiment, the wireless technologies are based on a position-sensing device accessing or capturing television signals from such as three TV signal transmission towers. Triangulation techniques are then performed using synchronization codes in the TV signals to identify the location of that position-sensing device. In embodiments where positions are identified not based on GPS technologies, pseudo-ranges can become estimates of distances between position-sensing devices and locations whose known and well-defined co-ordinates can be broadcasted and captured by the position-sensing devices.

The above-described systems, devices, methods and processes can be used together with other aspects of a monitoring system, including the various aspects described in: (i) U.S. Provisional Patent Application No. 60/444,198, filed Jan. 30, 2003, and entitled "SYSTEM, METHOD AND APPARATUS FOR ACQUIRING, PRESENTING, MONITORING, DELIVERING, MANAGING AND USING STATUS INFORMATION," which is hereby incorporated herein by reference; (ii) U.S. Provisional Patent Application No. 60/418,491, filed Oct. 15, 2002, and entitled "SYSTEM, METHOD AND APPARATUS FOR ACQUIRING, PRESENTING, MONITORING, DELIVERING, MANAGING AND USING STATUS INFORMATION," which is hereby incorporated herein by reference; (iii) U.S. Provisional Patent Application No. 60/404,645, filed Aug. 19, 2002, and entitled "SYSTEM, METHOD AND APPARATUS FOR ACQUIRING, PRESENTING, MONITORING, DELIVERING, MANAGING AND USING POSITION AND OTHER INFORMATION," which is hereby incorporated herein by reference; and (iv) U.S. Provisional Patent Application No. 60/375,998, filed Apr. 24, 2002, and entitled "SYSTEM, METHOD AND APPARATUS FOR ACQUIRING, PRESENTING, MANAGING AND USING POSITION INFORMATION," which is hereby incorporated herein by reference.

The various embodiments, implementations, features and aspects of the invention noted above (including those incorporated by reference) can be combined in various ways or used separately. Those skilled in the art will understand from the description that the invention can be equally applied to or used in other various different settings with respect to various combinations, embodiments, implementations or features provided in the description herein.

The invention can be implemented in software, hardware or a combination of hardware and software. The invention, or at least certain software portions of the invention, can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, optical data storage devices, and carrier waves. The computer readable medium can also be distributed over network-coupled computer systems so that the computer readable code is stored and executed in a distributed fashion.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

The invention claimed is:

1. A position sensing system comprising:
a GPS position-sensing device, wherein the position-sensing device includes:
a position antenna configured to receive high-frequency signals;
a down converter coupled to the position antenna and configured to convert the high-frequency signals to low-frequency signals;
a position baseband circuit coupled to the down converter and configured to extract raw position data from the low-frequency signals; and
a communication baseband circuit coupled to the position baseband circuit and configured to transmit the raw position data to a portable position-computing device, which converts the raw position data into the location of the position-sensing device,
wherein the raw position data is GPS information that needs additional processing for identification of the data's corresponding position, and
wherein the raw position data is processed by the portable position-computing device into the location of the position-sensing device.

2. A position sensing system as recited in claim 1 wherein the position-computing device is a personal digital assistant.

3. A position sensing system as recited in claim 1 wherein the position-computing device is a pager.

4. A position sensing system as recited in claim 1 wherein the position-computing device is a cell phone.

5. A position sensing system as recited in claim 1,
Wherein the position sensing device wirelessly transmits the raw position data to the portable position-computing device, and
wherein the position-computing device receives the transmitted raw position data through Bluetooth protocol.

6. A position sensing system as recited in claim 1,
Wherein the position sensing device wirelessly transmits the raw position data to the portable position-computing device, and
wherein the position-computing device receives the transmitted raw position data through Wi-Fi protocol.

7. A position sensing system as recited in claim 1 wherein the position-computing device is wirelessly coupled to a headset to provide voice output to a user.

8. A position sensing system as recited in claim 1 further comprising an auxiliary sensor configured to sense auxiliary information.

9. A position sensing system as recited in claim 8 wherein the auxiliary information is transmitted to the position-computing device.

10. A position sensing system as recited in claim 9 wherein the position-computing device analyzes the auxiliary information and the location of the position-sensing device to determine an action.

11. A position sensing system as recited in claim 9 wherein the position-computing device wirelessly transmits the auxiliary information and the location of the position-sensing device to a remote site.

12. A position sensing system as recited in claim 11 wherein the remote site analyzes the auxiliary information and the position-sensing device location to determine an action.

13. A position sensing system as recited in claim 12 wherein, based on the analysis, a signal is transmitted to the position-computing device to perform the action.

14. A position sensing system as recited in claim 8 wherein the auxiliary sensor is configured to capture information related to the environment where the position-sensing device is located.

15. A position sensing system as recited in claim 8 wherein the auxiliary sensor is configured to capture information pertaining to the position-sensing device.

16. A position sensing system as recited in claim 8 wherein the auxiliary sensor is configured to capture information regarding a living being associated with the position-sensing device.

17. A position sensing system as recited in claim 8 wherein at least a part of the circuitry of the auxiliary sensor is integrated with at least a part of the circuitry of the position-sensing device.

18. A position sensing system as recited in claim 1 wherein the position-computing device wirelessly transmits the location of the position-sensing device to a remote site.

19. A position sensing system as recited in claim 18 wherein the remote site transmits a piece of information back to the position-computing device based on at least the location of the position-sensing device that was received from the position-computing device.

20. A position sensing system as recited in claim 18 wherein the remote site includes a website.

21. A position sensing system as recited in claim 10 further comprising an actuator coupled to the position-computing device and configured to perform an action based on the analysis.

22. A position sensing system as recited in claim 12 further comprising an actuator configured to perform an action based on the analysis.

23. A position sensing system as recited in claim 22 wherein the action performed includes providing a message to a user.

24. A position sensing system as recited in claim 22 wherein the action performed includes providing a message to a system.

25. A position sensing system as recited in claim 22 wherein the action performed includes an action directly on a user.

26. A position sensing system as recited in claim 22 wherein the action performed includes an action on the environment of the position-sensing device.

27. A position sensing system as recited in claim 22 wherein the action is modified in view of subsequent auxiliary information from the auxiliary sensor.

28. A mobile device for acquiring status information pertaining to an object, said mobile device being proximate to the object, said mobile device comprising:
- a wireless communication module for receiving or transmitting signals in a wireless manner;
- a GPS receiver for receiving GPS data;
- at least one auxiliary sensor for acquiring auxiliary data; and
- a controller operatively connected to said wireless communication module, said GPS receiver, and said at least one auxiliary sensor;
- wherein said controller controls operation of said mobile device including acquisition of the GPS data and the auxiliary data, and causes said wireless communication module to at least transmit information related to the GPS data and information related to the auxiliary data to a remote server or another mobile device,
- wherein said wireless communication module and said GPS receiver share at least a portion of their circuitry,
- wherein the object is not a living object, and
- wherein the auxiliary data pertains to the object, said mobile device, or an environment of the object or said mobile device.

29. A mobile device as recited in claim 28, wherein said wireless communication module supports a plurality of wireless networks.

30. A mobile device as recited in claim 29, wherein the plurality of wireless networks include at least a local area network, a wide area or global network.

31. A mobile device as recited in claim 30, wherein the local area network is one of a Bluetooth network and a Wi-Fi network, and wherein the wide area or the global network is a SMS network.

32. A mobile device as recited in claim 28, wherein said mobile device further comprises an actuator.

33. A mobile device as recited in claim 28, wherein the wireless communication module and the GPS receiver are formed on a single integrated circuit.

34. A mobile device for acquiring status information pertaining to an object, said mobile device being proximate to the object, said mobile device comprising:
- a wireless communication module for receiving or transmitting signals in a wireless manner;
- a GPS receiver for receiving GPS data;
- at least one auxiliary sensor for acquiring auxiliary data; and
- a controller operatively connected to said wireless communication module, said GPS receiver, and said at least one auxiliary sensor;
- wherein said controller controls operation of said mobile device including acquisition of the GPS data and the auxiliary data, and causes said wireless communication module to at least transmit information related to the GPS data and information related to the auxiliary data to a remote server or another mobile device,
- wherein said wireless communication module and said GPS receiver share at least a portion of their circuitry,
- wherein the object is a living object, and
- wherein the auxiliary data pertains to a health condition of the object, said mobile device, or an environment of the object or said mobile device.

* * * * *